US012574151B2

(12) United States Patent
Noh et al.

(10) Patent No.: US 12,574,151 B2
(45) **Date of Patent: \*Mar. 10, 2026**

(54) HARQ AND LINK ADAPTATION IN WIRELESS COMMUNICATION SYSTEM

(71) Applicant: Senscomm Semiconductor Co., Ltd., Suzhou (CN)

(72) Inventors: Yujin Noh, Laguna Hills, CA (US); Seung Hyeok Ahn, Laguna Hills, CA (US); Seung Ho Choo, Suzhou (CN); Young Hwan Kang, Suzhou (CN); Jungchul Shin, Suzhou (CN); Tan Joong Park, Seoul (KR); Daehong Kim, Laguna Hills, CA (US); Sung Jin Park, Seoul (KR)

(73) Assignee: Senscomm Semiconductor Co., Ltd., Suzhou (CN)

( * ) Notice: Subject to any disclaimer, the term of this patent is extended or adjusted under 35 U.S.C. 154(b) by 551 days.

This patent is subject to a terminal disclaimer.

(21) Appl. No.: 18/050,961

(22) Filed: Oct. 28, 2022

(65) Prior Publication Data

US 2023/0146240 A1 May 11, 2023

Related U.S. Application Data

(60) Provisional application No. 63/376,593, filed on Sep. 21, 2022, provisional application No. 63/370,913, (Continued)

(30) Foreign Application Priority Data

Oct. 24, 2022 (CN) .......................... 202211305990.0

(51) Int. Cl.
*H04W 4/00* (2018.01)
*H04L 1/08* (2006.01)
*H04L 1/1812* (2023.01)

(52) U.S. Cl.
CPC .............. *H04L 1/08* (2013.01); *H04L 1/1812* (2013.01)

(58) Field of Classification Search
USPC ................................................. 370/329, 330
See application file for complete search history.

(56) References Cited

U.S. PATENT DOCUMENTS

2020/0280399 A1* 9/2020 Kim ...................... H04L 1/1864
2021/0099256 A1* 4/2021 Lee ...................... H04L 1/1893
(Continued)

FOREIGN PATENT DOCUMENTS

WO 2021/066326 A1 4/2021

OTHER PUBLICATIONS

Office Action for CN 202211305990.0 by China National Intellectual Property Administration dated Jun. 18, 2025.

*Primary Examiner* — Chuong T Ho
(74) *Attorney, Agent, or Firm* — BROADVIEW IP LAW, PC

(57) ABSTRACT

An electronic device receives a first data unit including a first hybrid automatic repeat request (HARQ) unit and transmits a second data unit including first HARQ-related information indicating that the first HARQ unit fails to be decoded. The electronic device receives a third data unit including a preamble. The preamble includes a first STF, a first LTF, a signal field, a second STF, and a second LTF, and the third data unit includes second HARQ-related information indicating whether the third data unit includes retransmitted data. The electronic device obtains a second HARQ unit based on determination that the second HARQ-related information indicates that the third data unit includes retransmitted data and decodes the second HARQ unit with the first HARQ unit.

16 Claims, 25 Drawing Sheets

Related U.S. Application Data filed on Aug. 9, 2022, provisional application No. 63/273,440, filed on Oct. 29, 2021.

(56) References Cited

U.S. PATENT DOCUMENTS

| | | | |
|---|---|---|---|
| 2022/0337353 A1* | 10/2022 | Zhang | H04L 1/0061 |
| 2022/0416983 A1* | 12/2022 | Song | H04W 72/04 |
| 2023/0188270 A1* | 6/2023 | Ouyang | H04L 1/18 |
| | | | 370/328 |

* cited by examiner

EHT TB PPDU format

FIG. 10A

| Octets:2 | 2 | 6 | 0 or 6 | 0 or 6 | 0 or 2 | 0 or 6 | 0 or 2 | 0 or 4 | variable | 4 |
|---|---|---|---|---|---|---|---|---|---|---|
| Frame Control | Duration /ID | Address 1 | Address 2 | Address 3 | Sequence Control | Address 4 | QoS Control | HT Control | Frame Body | FCS |

MAC header

FIG. 10B

| Variant | B0 | B1 | B2-B29 | B30 | B31 |
|---------|----|----|--------|-----|-----|
| HT | 0 | 0 | HT Control Middle | AC Constraint | RDG/More PPDU |
| VHT | 1 | 0 | VHT Control Middle | AC Constraint | RDG/More PPDU |
| HE | 1 | 1 | A-Control | | |

| Control List | Padding |
|:---:|:---:|
| Bits:     Variable | 0 or more |

B0               B3

| Control ID | Control Information |
|:---:|:---:|
| Bits:      4 | Variable |

| Unsolicited MFB | MRQ | NSS | MCS | PS160 | RU Allocation |
|---|---|---|---|---|---|

Bits:    1     1     3     4     1     8

| BW | MSI/Partial PPDU Parameters | Tx Beamforming | UL TB PPDU MFB | BW extension |
|---|---|---|---|---|

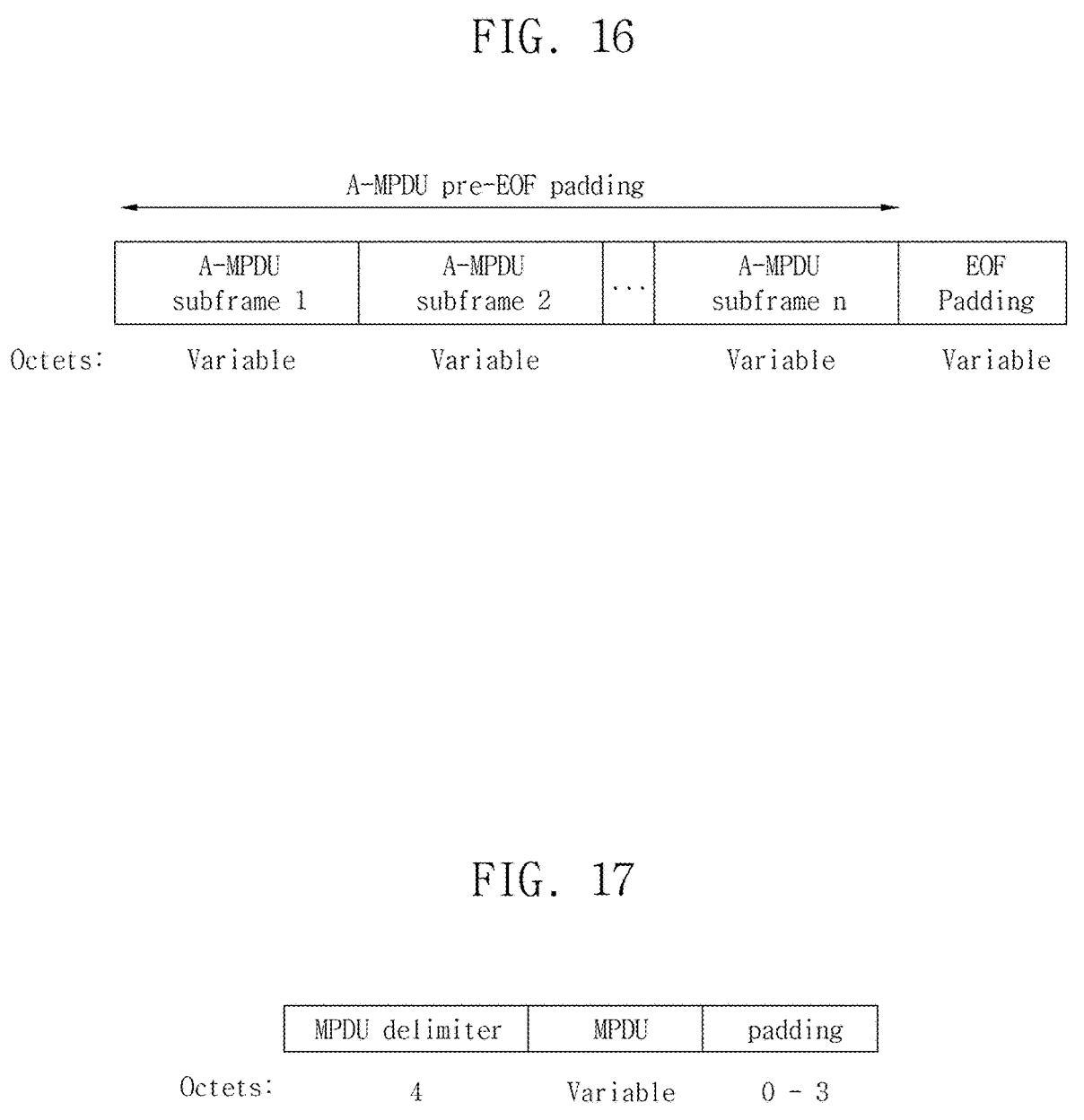

A-MPDU pre-EOF padding

| A-MPDU subframe 1 | A-MPDU subframe 2 | ... | A-MPDU subframe n | EOF Padding |
|---|---|---|---|---|

Octets:      Variable           Variable              Variable        Variable

FIG. 17

| MPDU delimiter | MPDU | padding |
|---|---|---|

Octets:          4         Variable     0 - 3

FIG. 18

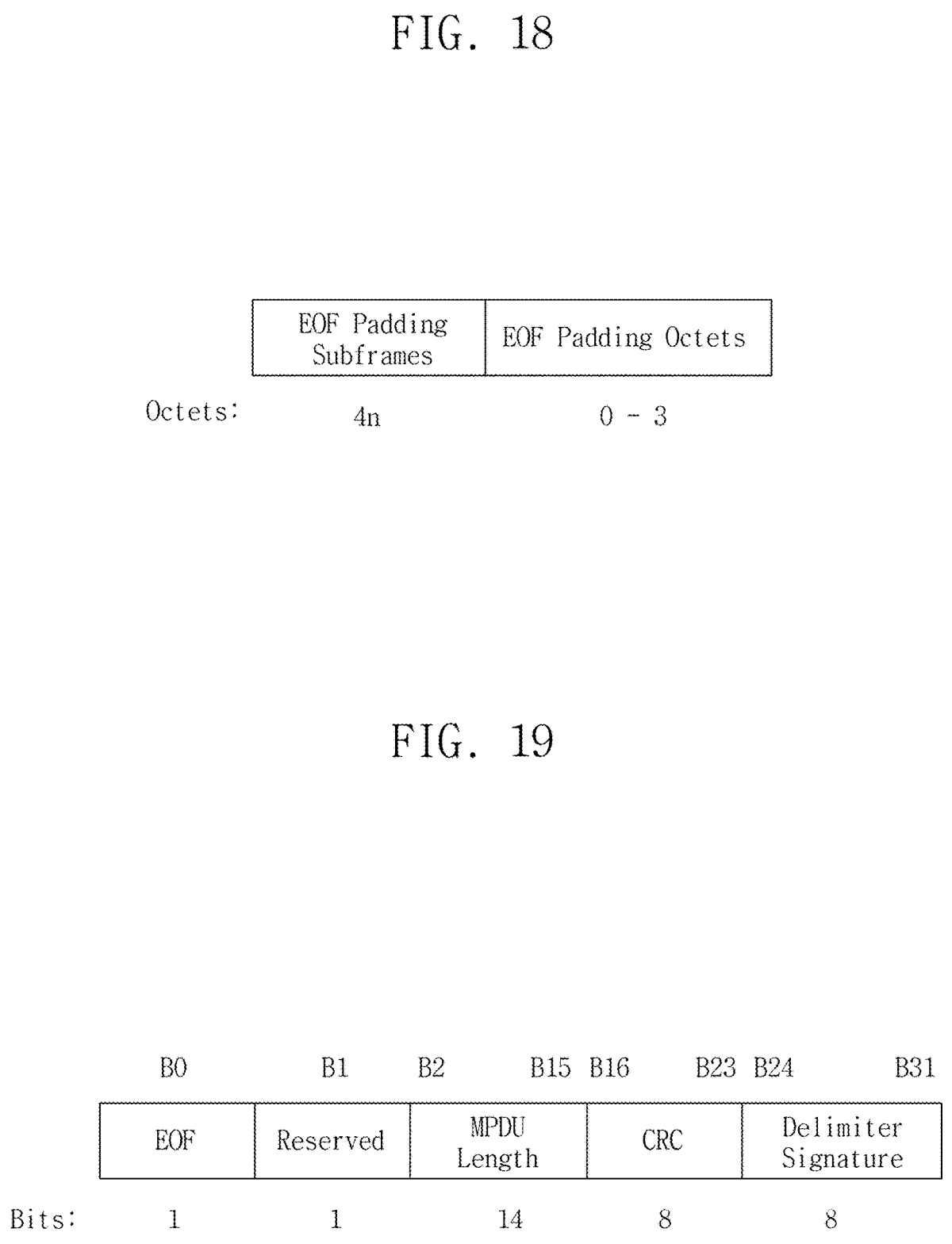

| EOF Padding Subframes | EOF Padding Octets |
|---|---|

Octets:          4n          0 ~ 3

FIG. 19

| B0 | B1 | B2          B15 | B16          B23 | B24          B31 |
|---|---|---|---|---|
| EOF | Reserved | MPDU Length | CRC | Delimiter Signature |

Bits:          1          1          14          8          8

FIG. 22

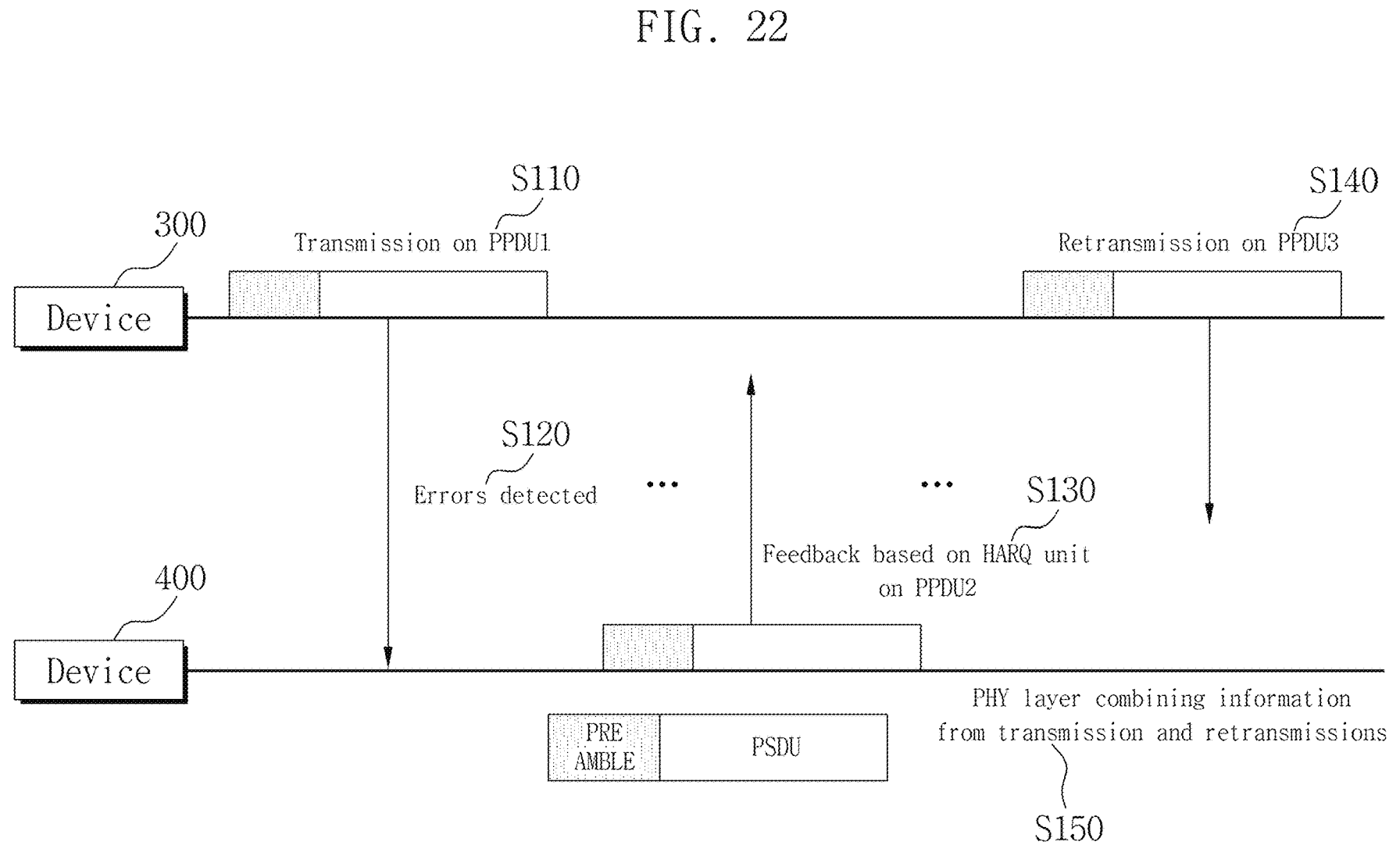

300 Device

400 Device

S110
Transmission on PPDU1

S120
Errors detected

S130
Feedback based on HARQ unit on PPDU2

S140
Retransmission on PPDU3

S150
PHY layer combining information from transmission and retransmissions

PRE AMBLE

PSDU errors                                     errors

| TX | MPDU1 | MPDU2 | MPDU3 | ··· | | retransmitted    retransmitted    retransmitted         retransmitted

| ReTX | MPDU1 | MPDU2 | MPDU3 | ··· | | errors     errors     errors

Initial transmission

CW 1 | CW 2 | CW 3 | CW N

Info 1 | P1 | Info 2 | P2 | Info 3 | P3 | ⋯ | Info N | PN

Errors          Errors

Retransmission

Initial transmission

| CW 1 | CW 2 | CW 3 | CW N |
|------|------|------|------|
| Info 1 | Errors | Errors | ... |

| Info 1 | P1 | Info 2 | P2 | Info 3 | P3 | Info N | PN |

Retransmission

| P2' | P3' | ... |

HARQ AND LINK ADAPTATION IN WIRELESS COMMUNICATION SYSTEM

CROSS REFERENCE TO RELATED APPLICATIONS

This application claims benefit of U.S. Provisional Application No. 63/376,593 filed on Sep. 21, 2022, U.S. Provisional Application No. 63/370,913 filed on Aug. 9, 2022, and U.S. Provisional Application No. 63/273,440 filed on Oct. 29, 2021, in the United States Patent and Trademark Office, and China Patent Application No. 2022113059900 filed on Oct. 24, 2022, in the China National Intellectual Property Administration, the entire contents of which are hereby incorporated by reference.

TECHNICAL FIELD

The disclosure relates to wireless communication systems, and more particularly to, for example, but not limited to, hybrid automatic repeat request (HARQ) and link adaptation.

BACKGROUND

Wireless communication devices are increasingly required to support a variety of delay-sensitive applications or real-time applications such virtual reality (VR), online gaming, as augmented reality (AR), robotics, artificial intelligence (AI), cloud computing, and unmanned vehicles. To implement extremely low latency and extremely high throughput required by such applications, the HARQ is being considered as one of key technologies in a new amendment standard IEEE 802.11be Extremely High Throughput (EHT), also known as Wi-Fi 7. The conventional WLAN systems have used an automatic repeat request (ARQ) procedure that merely relies on the retransmission procedure in the perspective of a medium access control (MAC) protocol data unit (MPDU). However, the MPDU as is cannot be used as an HARQ unit because the MPDU is a data unit in the MAC layer and a combining process in the HARQ procedure is performed in the PHY layer.

The description set forth in the background section should not be assumed to be prior art merely because it is set forth in the background section. The background section may describe aspects or embodiments of the present disclosure.

SUMMARY

Embodiments allow the electronic devices to facilitate wireless communication supporting the HARQ procedure.

One aspect of the present disclosure provides an electronic device for facilitating wireless communication, comprising: one or more memories; and one or more processors coupled to the one or more memories, the one or more processors configured to cause: receiving a first data unit including a first short training field (STF), a first long training field (LTF), a signal field, a second STF, a second LTF, and a data field including a first hybrid automatic repeat request (HARQ) unit; transmitting a second data unit including first HARQ-related information indicating that the first HARQ unit fails to be decoded; receiving a third data unit including a preamble, wherein the preamble includes a first STF, a first LTF, a signal field, a second STF, and a second LTF, and the third data unit includes second HARQ-related information indicating whether the third data unit includes retransmitted data; obtaining a second HARQ unit based on determination that the second HARQ-related information indicates that the third data unit includes retransmitted data; and decoding the second HARQ unit with the first HARQ unit.

The second HARQ-related information may be included in the signal field of the preamble of the third data unit.

The signal field may include a user field including a first subfield indicating a station identifier and a second subfield indicating the third data unit includes retransmitted data.

The first data unit may include a MAC header including a link adaptation control subfield including a first MCS (modulation and coding scheme) request (MRQ) subfield and a first MRQ sequence identifier (MSI) subfield, the third data unit may include a MAC header including a link adaptation control subfield including a second MRQ subfield and a second MSI subfield, the second MSI subfield set equal to a MSI value indicated by the first MSI subfield may indicate that the third data unit includes retransmitted data, and the second MSI subfield set different from a MSI value indicated by the first MSI subfield may indicate that the third data unit does not include retransmitted data.

The second HARQ-related information may be indicated by a bitmap including a plurality of bits, each of the plurality associated with a respective one of HARQ units in the first data unit.

The second HARQ-related information may be indicated by a field set equal to a state of a plurality of states in a lookup table, wherein the plurality of states in the lookup table represents a respective one of error combinations of HARQ units in the first data unit.

A scrambler seed used for the second HARQ unit may be the same as a scrambler seed used for the first HARQ unit.

Obtaining the second HARQ unit may comprise: receiving a fourth data unit following the third data unit, the fourth data unit including a first short training field (STF), a first long training field (LTF), a signal field, a second STF, and a second LTF, and a data field; and obtaining the second HARQ unit from the data field of the fourth data unit according to parameters in the signal field in the fourth data unit.

The signal field of the third data unit may include no parameter used for obtaining the second HARQ unit and the second HARQ unit may be obtained according to one or more parameters in the signal field in the first data unit.

The first HARQ unit may be a low-density parity check (LDPC) codeword including information bits and parity bits.

The second HARQ unit may be a low-density parity check (LDPC) codeword including information bits and parity bits.

The second HARQ unit may be a low-density parity check (LDPC) codeword including parity bits and excluding information bits.

The first HARQ unit may be a group of low-density parity check (LDPC) codewords.

The first HARQ unit may be a MPDU.

The one or more processors may be configured to further cause: discarding the first HARQ unit if the third data unit include a HARQ unit that is not indicated by the first HARQ-related information.

Another aspect of the present disclosure provides an electronic device for facilitating wireless communication, the device comprising: one or more memories; and one or more processors coupled to the one or more memories, the one or more processors configured to cause: transmitting a first data unit including a first short training field (STF), a first long training field (LTF), a signal field, a second STF, a second LTF, and a data field including a first hybrid automatic repeat request (HARQ) unit; receiving a second data unit including first HARQ-related information indicating that the first HARQ unit fails to be decoded; and transmitting a third data unit including a preamble, wherein the preamble includes a first STF, a first LTF, a signal field, a second STF, and a second LTF, and the third data unit includes second HARQ-related information indicating whether the third data unit includes retransmitted data.

The second HARQ-related information may be included in the signal field of the preamble of the third data unit.

The signal field may include a user field including a first subfield indicating a station identifier and a second subfield indicating the third data unit includes retransmitted data.

The first data unit may include a MAC header including a link adaptation control subfield including a first MCS (modulation and coding scheme) request (MRQ) subfield and a first MRQ sequence identifier (MSI) subfield, the third data unit may include a MAC header including a link adaptation control subfield including a second MRQ subfield and a second MSI subfield, the second MSI subfield set equal to a MSI value indicated by the first MSI subfield may indicate that the third data unit includes retransmitted data, and the second MSI subfield set different from a MSI value indicated by the first MSI subfield may indicate that the third data unit does not include retransmitted data.

Another aspect of the present disclosure provides a method performed by an electronic device, comprising: receiving a first data unit including a first short training field (STF), a first long training field (LTF), a signal field, a second STF, a second LTF, and a data field including a first hybrid automatic repeat request (HARQ) unit; transmitting a second data unit including first HARQ-related information indicating that the first HARQ unit fails to be decoded; receiving a third data unit including a preamble, wherein the preamble includes a first STF, a first LTF, a signal field, a second STF, and a second LTF, and the third data unit includes second HARQ-related information indicating whether the third data unit includes retransmitted data; obtaining a second HARQ unit based on determination that the second HARQ-related information indicates that the third data unit includes retransmitted data; and decoding the second HARQ unit with the first HARQ unit.

BRIEF DESCRIPTION OF THE DRAWINGS

FIG. 10A shows the format of the MAC frame in accordance with an embodiment.

FIG. 10B shows the format of the HT Control field in accordance with an embodiment.

FIG. 16 shows A-MPDU format in accordance with an embodiment.

FIG. 17 shows the structure of the A-MPDU subframe in accordance with an embodiment.

FIG. 18 shows the structure of the EOF Padding field in accordance with an embodiment.

FIG. 19 shows the structure of an MPDU delimiter in accordance with an embodiment.

FIG. 22 shows an HARQ procedure in accordance with an embodiment.

FIG. 26 shows initial HARQ units and retransmitted HARQ units in an HARQ procedure in accordance with another embodiment.

DETAILED DESCRIPTION

Figure 1:
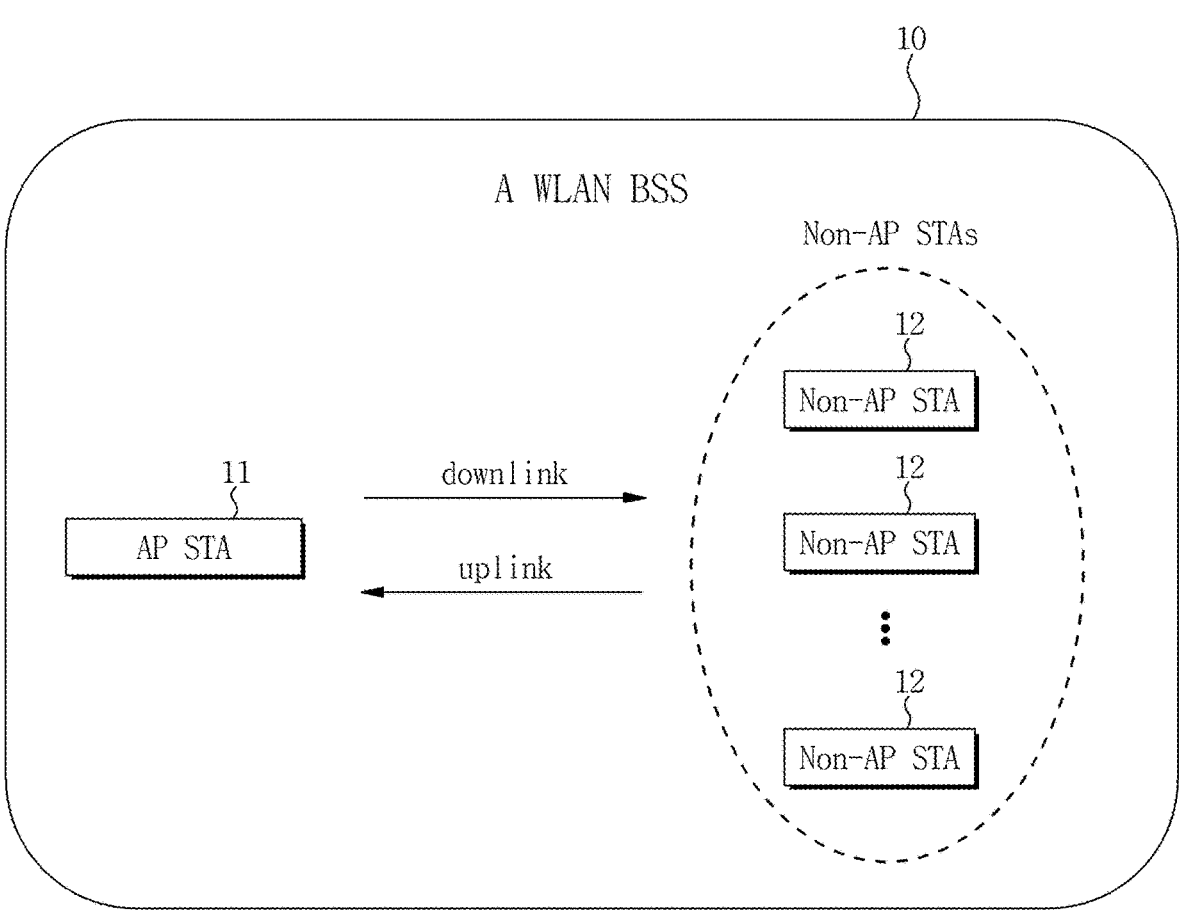
FIG. 1 illustrates a schematic diagram of an example wireless communication network.

The detailed description set forth below is intended to describe various implementations and is not intended to represent the only implementation. As those skilled in the art would realize, the described implementations may be modified in various different ways, all without departing from the scope of the present disclosure. Accordingly, the drawings and description are to be regarded as illustrative in nature and not restrictive. Like reference numerals designate like elements.

The below detailed description herein has been described with reference to a wireless LAN system according to the Institute of Electrical and Electronics Engineers (IEEE) 802.11 wireless standards including the current and future amendments. However, a person having ordinary skill in the art will readily recognize that the teachings herein are applicable to other network environments, such as cellular telecommunication networks and wired telecommunication networks.

In some embodiments, apparatuses or devices such as an AP STA and a non-AP may include one or more hardware and software logic structure for performing one or more of the operations described herein. For example, the apparatuses or devices may include at least one memory unit which stores instructions that may be executed by a hardware processor installed in the apparatus and at least one processor which is configured to perform operations or processes described in the disclosure. The apparatus may also include one or more other hardware or software elements such as a network interface and a display device.

FIG. 1 illustrates a schematic diagram of an example wireless communication network.

Referring to FIG. 1, a basic service set (BSS) 10 may include a plurality of stations (STAs) including an access point (AP) station (AP STA) 11 and one or more non-AP station (non-AP STA) 12. The STAs may share a same radio frequency channel with one out of WLAN operation bandwidth options (e.g., 20/40/80/160/320 MHz). Hereinafter, in some embodiments, the AP STA and the non-AP STA may be referred as AP and STA, respectively. In some embodiments, the AP STA and the non-AP STA may be collectively referred as station (STA).

The plurality of STAs may participate in multi-user (MU) transmission. In the MU transmission, the AP STA 11 may simultaneously transmit the downlink frames to the multiple non-AP STAs 12 in the BSS 10 based on different resources and the multiple non-AP STAs 12 may simultaneously transmit the uplink frames to the AP STA 11 in the BSS 10 based on different resources.

For the MU transmission, multi-user multiple input, multiple output (MU-MIMO) transmission or orthogonal frequency division multiple access (OFDMA) transmission may be used. In MU-MIMO transmission, with one or more antennas, the multiple non-AP STAs 12 may either simultaneously transmit to the AP STA 11 or simultaneously receive from the AP STA 11 independent data streams over the same subcarriers. Different frequency resources may be used as the different resources in the MU-MIMO transmission. In OFDMA transmission, the multiple non-AP STAs 12 may either simultaneously transmit to the AP STA 11 or simultaneously receive from the AP STA 11 independent data streams over different groups of subcarriers. Different spatial streams may be used as the different resources in MU-MIMO transmission.

Figure 2:
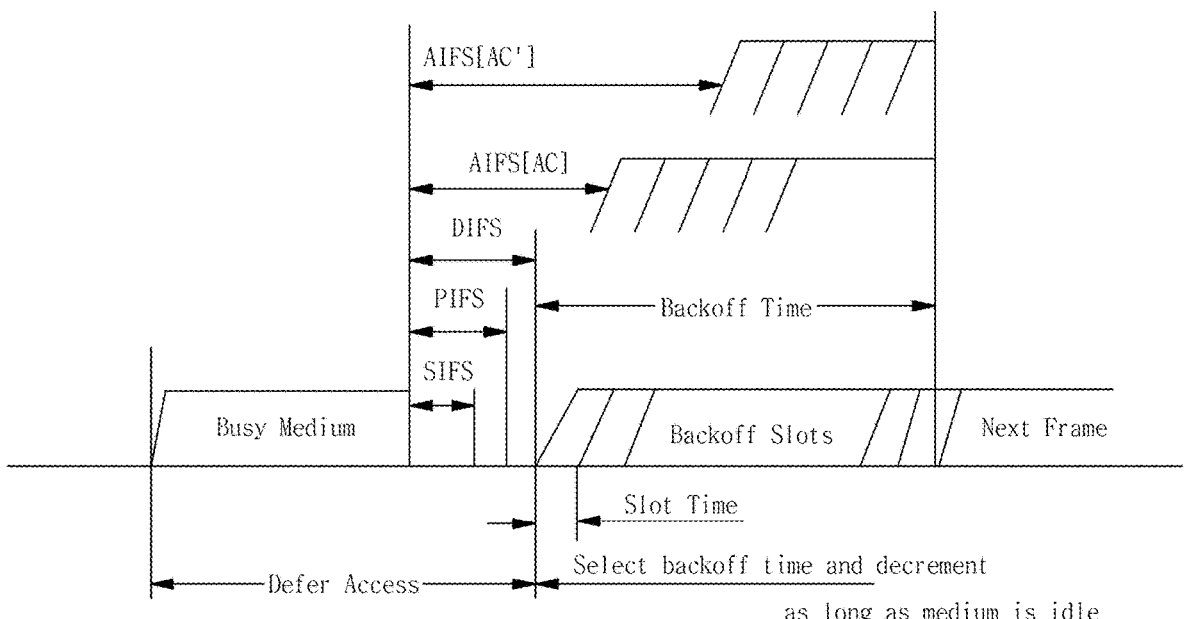
FIG. 2 illustrates an example of a timing diagram of interframe space (IFS) relationships between stations in accordance with an embodiment.

FIG. 2 illustrates an example of a timing diagram of interframe space (IFS) relationships between stations in accordance with an embodiment.

In particular, FIG. 2 shows a CSMA (carrier sense multiple access)/CA (collision avoidance) based frame transmission procedure for avoiding collision between frames in a channel.

A data frame, a control frame, or a management frame may be exchanged between STAs.

The data frame may be used for transmission of data forwarded to a higher layer. Referring to FIG. 2, access is deferred while the medium is busy until a type of IFS duration has elapsed. The STA may transmit the data frame after performing backoff if a distributed coordination function IFS (DIFS) has elapsed from a time when the medium has been idle.

The management frame may be used for exchanging management information which is not forwarded to the higher layer. Subtype frames of the management frame may include a beacon frame, an association request/response frame, a probe request/response frame, and an authentication request/response frame.

The control frame may be used for controlling access to the medium. Subtype frames of the control frame include a request to send (RTS) frame, a clear to send (CTS) frame, and an acknowledgement (ACK) frame. In the case that the control frame is not a response frame of the other frame, the STA may transmit the control frame after performing backoff if the DIFS has elapsed. If the control frame is the response frame of a previous frame, the WLAN device may transmit the control frame without performing backoff if a short IFS (SIFS) has elapsed. The type and subtype of frame may be identified by a type field and a subtype field in a frame control field.

On the other hand, a Quality of Service (QOS) STA may transmit the frame after performing backoff if an arbitration IFS (AIFS) for access category (AC), i.e., AIFS[AC] has elapsed. In this case, the data frame, the management frame, or the control frame which is not the response frame may use the AIFC[AC].

In some embodiments, a point coordination function (PCF) enabled AP STA may transmit the frame after performing backoff if a PCF IFS (PIFS) has elapsed. The PIFS duration may be less than the DIFS but greater than the SIFS.

Figure 3:
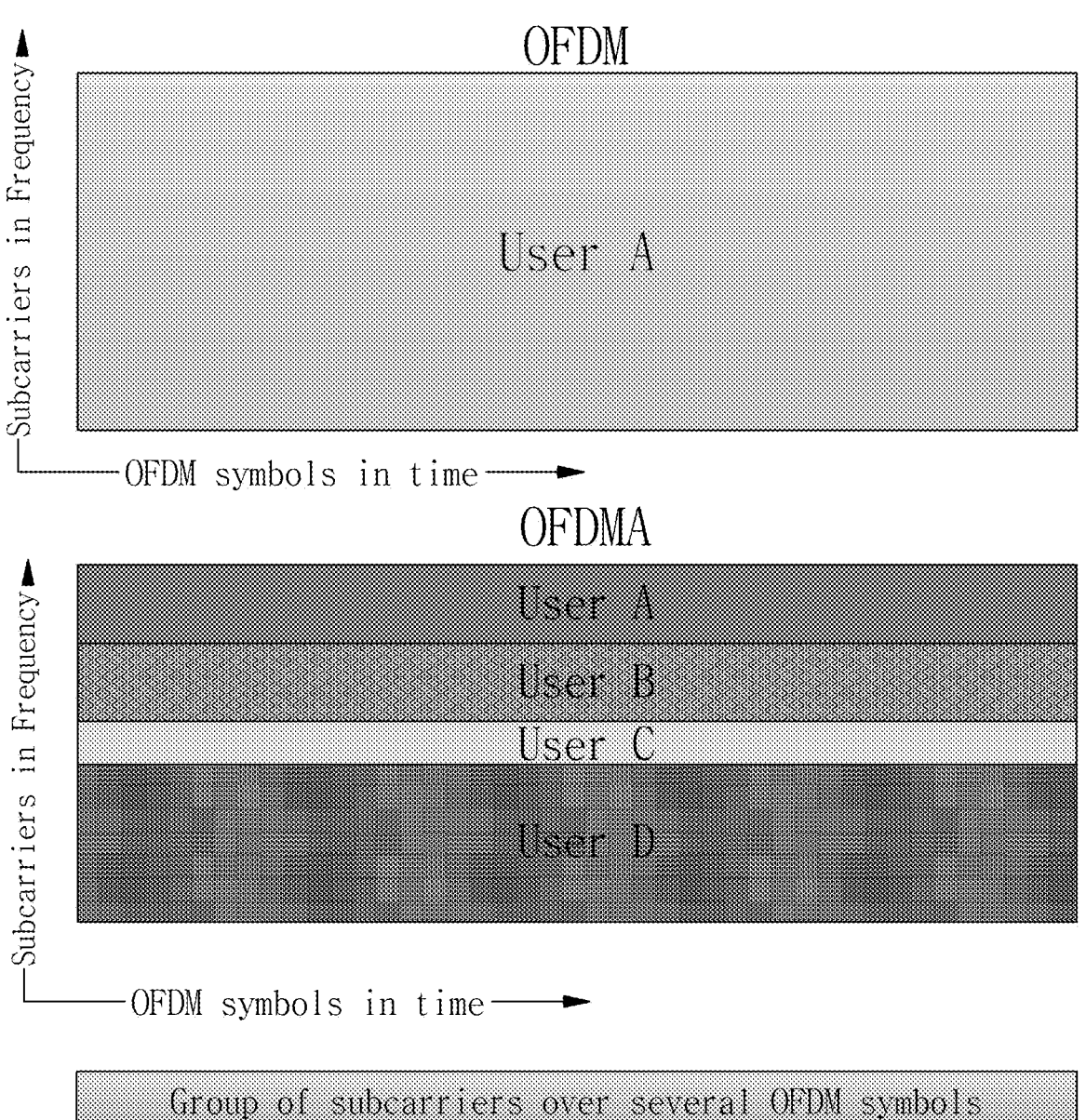
FIG. 3 shows an OFDM symbol and an OFDMA symbol in accordance with an embodiment.

FIG. 3 shows an OFDM symbol and an OFDMA symbol in accordance with an embodiment.

For multi-user access modulation, the orthogonal frequency division multiple access (OFDMA) for uplink and downlink has been introduced in IEEE 802.11ax standard known as High Efficiency (HE) WLAN and will be used in 802.11's future amendments such as EHT (Extreme High Throughput). One or more STAs may be allowed to use one or more resource units (RUS) throughout operation bandwidth to transmit data at the same time. One RU may be the minimum granularity which can be assigned and has decades of subcarriers in OFDM modulation symbol. Here, non-AP STAs may be associated or non-associated with AP STA when responding simultaneously in the assigned RUs within a specific period such as a short inter frame space (SIFS). The SIFS may be the time from the end of the last symbol, or signal extension if present, of the previous frame to the beginning of the first symbol of the preamble of the subsequent frame.

The OFDMA is an OFDM-based multiple access scheme where different subsets of subcarriers may be allocated to different users, allowing simultaneous data transmission to or from one or more users with high accurate synchronization for frequency orthogonality. In OFDMA, users may be allocated different subsets of subcarriers which can change from one physical layer (PHY) protocol data unit (PPDU) to the next. In OFDMA, an OFDM symbol is constructed of subcarriers, the number of which is a function of the PPDU bandwidth. The difference between OFDM and OFDMA is illustrated in FIG. 3.

In case of UL MU transmission, given different STAs with their own capabilities and features, the AP STA may want to have more control mechanism of the medium by using more scheduled access, which may allow more frequent use of OFDMA/MU-MIMO transmissions. PPDUs in UL MU transmission (MU-MIMO or OFDMA) may be sent as a response to the trigger frame sent by the AP. The trigger frame may have STA's information and assign RUs and multiple RUs (MRUs) to STAs. This allows an STA to transmit the OFDMA based packet format with TB PPDU (e.g., HE TB PPDU or EHT TB PPDU) which is segmented into RU and all RUs as a response of Trigger frame are allocated to the selected non-AP STAs accordingly. Hereafter, a single RU and a multiple RU may be referred to as the RU. The multiple RU may include, or consist of, predefined two RU combined.

In EHT, two EHT PPDU formats are defined: the EHT MU PPDU and the EHT TB PPDU. Hereinafter, the EHT MU PPDU and the EHT TB PPDU will be described with reference to FIG. 4A and FIG. 4B.

Figure 4A:
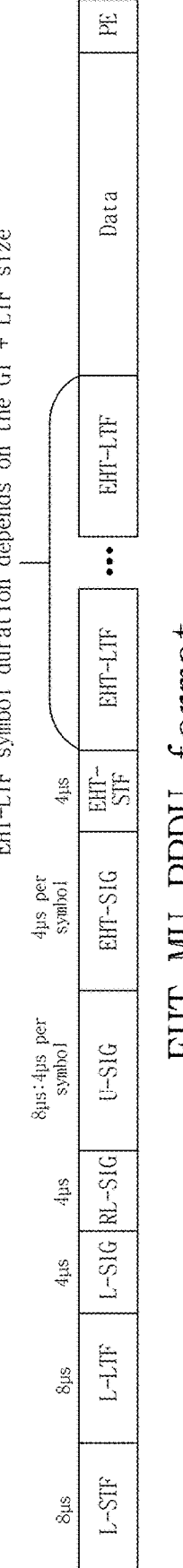
FIG. 4A illustrates the EHT MU PPDU format in accordance with an embodiment.

FIG. 4A illustrates the EHT MU PPDU format in accordance with an embodiment.

The EHT MU PPDU may be used for both single user transmission and multiple user transmission.

Referring to FIG. 4A, the EHT MU PPDU may include, or consist of, an EHT preamble (hereinafter referred to as a PHY preamble or a preamble), a data field, and a packet extension (PE) field. The EHT preamble may include, or consist of, pre-EHT modulated fields and EHT modulated fields. The pre-EHT modulated fields may include, or consist of, a Non-HT short training field (L-STF), a Non-HT long training field (L-LTF), a Non-HT signal (L-SIG) field, a repeated Non-HT signal (RL-SIG) field, a universal signal (U-SIG) field, and an EHT signal (EHT-SIG) field. The EHT modulated fields may include, or consist of, an EHT short training field (EHT-STF) and an EHT long training field (EHT-LTF). In some embodiments, the L-STF may be immediately followed by the L-LTF immediately followed by the L-SIG field immediately followed by the RL-SIG field immediately followed by the U-SIG field immediately followed by the EHT-SIG field immediately followed by the EHT-STF immediately followed by the EHT-LTF immediately followed by the data field immediately followed by the PE field.

The L-STF field may be utilized for packet detection, automatic gain control (AGC), and coarse frequency-offset correction.

The L-LTF field may be utilized for channel estimation, fine frequency-offset correction, and symbol timing.

The L-SIG field may be used to communicate rate and length information.

The RL-SIG field may be a repeat of the L-SIG field and may be used to differentiate an EHT PPDU from a non-HT PPDU, HT PPDU, and VHT PPDU.

The U-SIG field may carry information necessary to interpret EHT PPDUs.

The EHT-SIG field may provide additional signaling to the U-SIG field for STAs to interpret an EHT MU PPDU. Hereinafter, the U-SIG field, the EHT-SIG field, or both may be referred to as the SIG field.

The EHT-SIG field may include one or more EHT-SIG content channel. Each of the one or more EHT-SIG content channel may include a common field and a user specific field. The common field may contain information regarding the resource unit allocation such as the RU assignment to be used in the EHT modulated fields of the PPDU, the RUs allocated for MU-MIMO and the number of users in MU-MIMO allocations. The user specific field may include one or more user fields.

The user field for a non-MU-MIMO allocation may include a STA-ID subfield, a MCS subfield, a NSS subfield, a beamformed subfield, and a coding subfield. The user field for a MU-MIMO allocation may include a STA-ID subfield, a MCS subfield, a coding subfield, and a spatial configuration subfield.

The EHT-STF field may be used to improve automatic gain control estimation in a MIMO transmission.

The EHT-LTF field may enable the receiver to estimate the MIMO channel between the set of constellation mapper outputs and the receive chains.

The data field may carry one or more physical layer convergence procedure (PLCP) service data units (PSDUs).

The PE field may provide additional receive processing time at the end of the EHT MU PPDU.

Figure 4B:
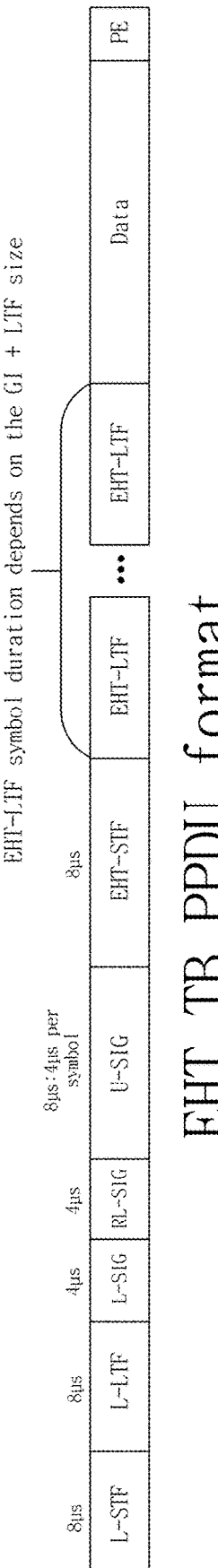
FIG. 4B illustrates the EHT TB PPDU format in accordance with an embodiment.

FIG. 4B illustrates the EHT TB PPDU format in accordance with an embodiment.

Referring to FIG. 4B, the EHT TB PPDU may include, or consist of, an EHT preamble (hereinafter referred to as a PHY preamble or a preamble), a data field, and a packet extension (PE) field. The EHT preamble may include, or consist of, pre-EHT modulated fields and EHT modulated fields. The pre-EHT modulated fields may include, or consist of, a Non-HT short training field (L-STF), a Non-HT long training field (L-LTF), a Non-HT signal (L-SIG) field, a repeated Non-HT signal (RL-SIG) field, and a universal signal (U-SIG) field. The EHT modulated fields may include, or consist of, an EHT short training field (EHT-STF) and an EHT long training field (EHT-LTF). In some embodiments, the L-STF may be immediately followed by the L-LTF immediately followed by the L-SIG field immediately followed by the RL-SIG field immediately followed by the U-SIG field immediately followed by the EHT-STF immediately followed by the EHT-LTF immediately followed by the data field immediately followed by the PE field.

Description for each field in the EHT TB PPDU will be omitted because description for each field in the EHT MU PPDU is applicable to the EHT TB PPDU.

Hereinafter, the EHT duplicate transmission will be described.

In the EHT duplicate transmission (hereinafter, referred to as DUP transmission, frequency domain duplication, or DUP mode), the transmitted data in the payload portion of the PPDU may be duplicated in frequency. The EHT duplicate transmission may be applicable only in the 6 GHz band in IEEE 802.11be (hereinafter, referred to as 11be). The EHT duplicate transmission may be applicable for single user transmission in an EHT MU PPDU over bandwidth 80/160/320 MHz without preamble puncturing in 11be. The EHT duplicate transmission may be applicable in conjunction with BPSK-DCM modulation, rate-1/2 Low density parity check (LDPC) coding, and one spatial stream in data portion of the PPDU in 11be. But all the restriction in 11be may not be limited to any specific features such as PPDU bandwidth, MCS (modulation and coding scheme) level or the number of spatial streams to support DUP transmission in general.

EHT DUP mode may be signaled by setting the PPDU Type And Compression Mode subfield of the U-SIG field to 1 to indicate an EHT transmission to single user, and setting the MCS field in EHT-SIG field to 14.

For an 80 MHz EHT MU PPDU transmitted in EHT DUP mode, encoding and BPSK-DCM modulation may be done for the first (e.g., lower) 484-tone RU, and then the first 484-tone RU may be duplicated to the second (e.g., upper) 484-tone RU along with a partial sign change to reduce a peak-to-average power ratio (PAPR).

For a 160 MHz EHT MU PPDU transmitted in EHT DUP mode, encoding and BPSK-DCM modulation may be done for the first 996-tone RU, and then the first 996-tone RU may be duplicated to the second 996-tone RU along with a partial sign change to reduce PAPR.

For a 320 MHz EHT MU PPDU transmitted in EHT-DUP mode, encoding and BPSK-DCM modulation may be done for first 2×996-tone RU, and then the first 2×996-tone RU may be duplicated to the second 2×996-tone RU along with a partial sign change to reduce PAPR.

The frequency domain duplication occurs after LDPC tone mapping and segment deparsing operations.

Hereinafter, electronic devices for facilitating wireless communication in accordance with various embodiments will be described with reference to FIGS. 5 to 9.

Figure 5:
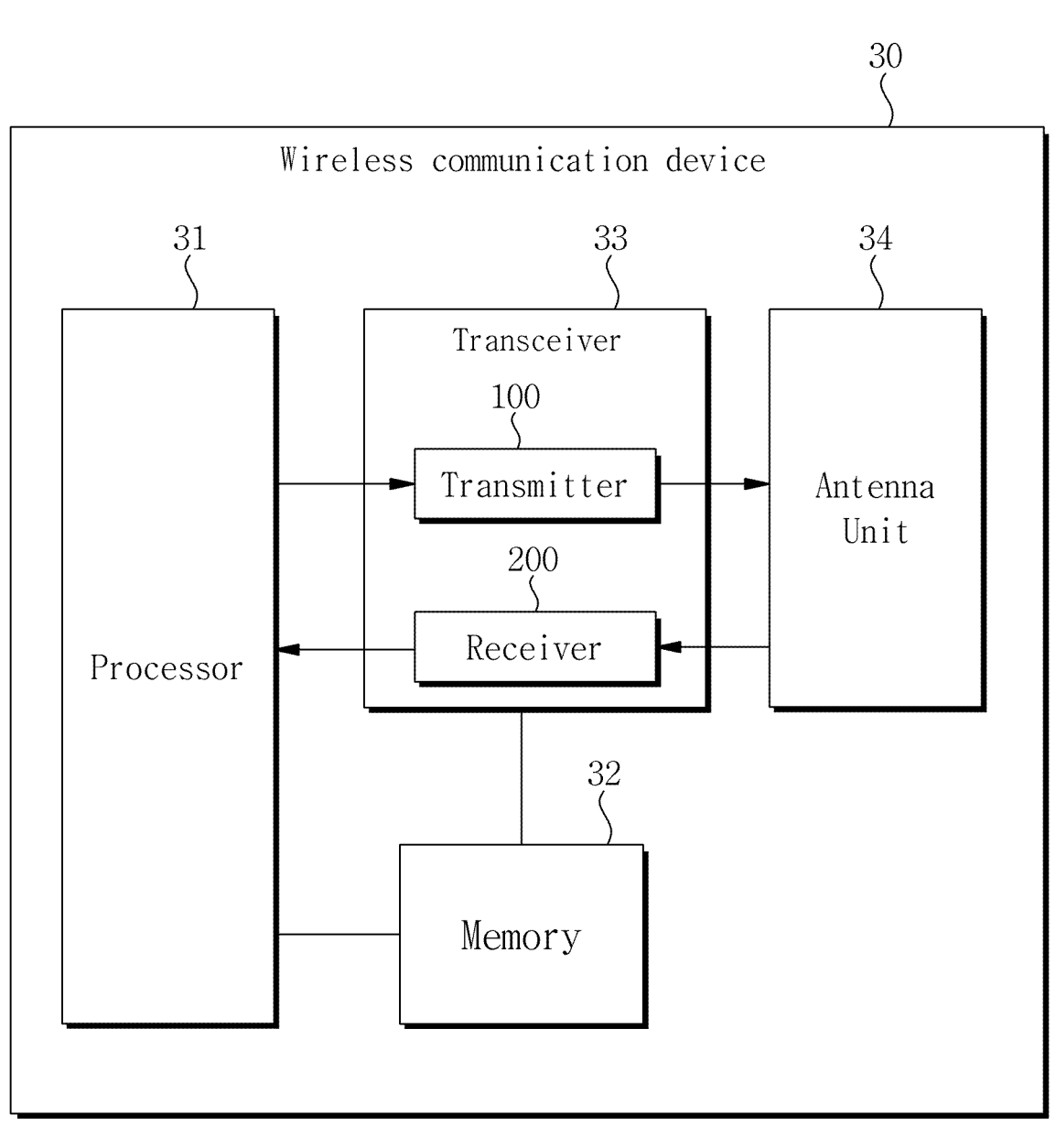
FIG. 5 is a block diagram of an electronic device for facilitating wireless communication in accordance with an embodiment.

FIG. 5 is a block diagram of an electronic device for facilitating wireless communication in accordance with an embodiment.

Referring to FIG. 5, an electronic device 30 for facilitating wireless communication in accordance with an embodiment may include a processor 31, a memory 32, a transceiver 33, and an antenna unit 34. The transceiver 33 may include a transmitter 100 and a receiver 200.

The processor 31 may perform MAC functions, PHY functions, RF functions, or a combination of some or all of the foregoing. In some embodiments, the processor 31 may comprise some or all of a transmitter 100 and a receiver 200. The processor 31 may be directly or indirectly coupled to the memory 32. In some embodiments, the processor 31 may include one or more processors.

The memory 32 may be non-transitory computer-readable recording medium storing instructions that, when executed by the processor 31, cause the electronic device 30 to perform operations, methods or procedures set forth in the present disclosure. In some embodiments, the memory 32

The pre-FEC PHY padder 101 may apply a pre-FEC PHY padding process on the information bits to output pre-FEC PHY padded bits.

The scrambler 103 may scramble pre-FEC PHY padded bits based on a scrambler seed to output $N_{DBPS}$ scrambled bits. For example, $N_{DBPS}$ may be 117 for the 80 MHz PPDU.

The LDPC encoder 105 may perform an LDPC encoding with the $N_{DBPS}$ scrambled bits to generate $N_{CBPS}$ LDPC encoded bits. For example, $N_{CBPS}$ may be 234 for the 80 MHz PPDU.

The LDPC code is one of block codes with a parity check matrix that contains only a very small number of non-zero elements. The parity check matrix is the matrix which explains the linear relations of codeword components. Each row of the parity check matrix corresponds to a parity-check equation and each column of parity check matrix corresponds to a bit in the codeword. The biggest difference between the LDPC code and existing block code is how they are decoded. The most existing block codes are decoded with Maximum likelihood (ML) decoding algorithms. ML based methods are usually short and designed algebraically to reduce complexity. However, LDPC codes are decoded iteratively using a graphical representation of their parity check matrix and designed to focus on the properties of the parity check matrix.

To encode an LDPC PPDU, the LDPC encoder 105 may compute the number of bits in the PSDU and a SERVICE field, $N_{pld}$, and the number of available bits, $N_{avbits}$, for example, according to the below equation 1. In 11be, $m_{STBC}$ may be 1, because 11be does not support STBC.

$$N_{pld} = \text{length} \times 8 + 16 \qquad\qquad \text{[Equation 1]}$$

$$N_{avbits} = N_{CBPS} \times m_{STBC} \times \left\lceil \frac{N_{pld}}{N_{CBPS} \times R \times m_{STBC}} \right\rceil$$

where $m_{STBC}$ is 2 if *STBC* is used and 1 otherwise
length is the value of the length field in the *L – SIG* field
$N_{pld}$ is the number of bits in the *PSDU* and the SERVICE field
$R$ is a code rate may store instructions that are needed by one or more of the processor 31, the transceiver 33, and other components of the electronic device 30. The memory may further store an operating system and applications. The memory 32 may comprise, be implemented as, or be included in a read-and-write memory, a read-only memory, a volatile memory, a non-volatile memory, or a combination of some or all of the foregoing.

The antenna unit 34 includes one or more physical antennas. When multiple-input multiple-output (MIMO) or multi-user MIMO (MU-MIMO) is used, the antenna unit 34 may include more than one physical antennas.

Figure 6:
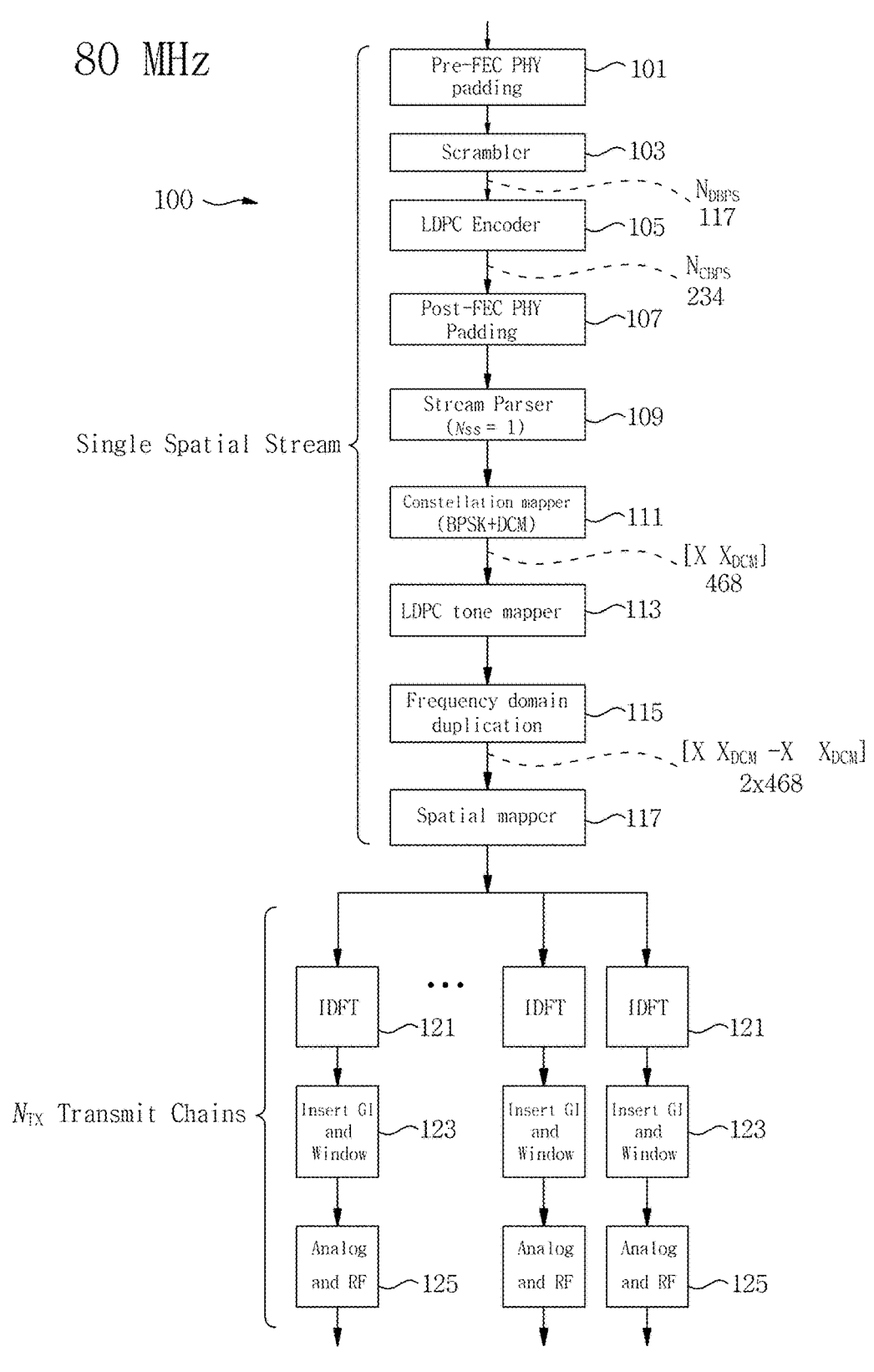
FIG. 6 is a block diagram of a transmitter for the transmission of a data field in 80 MHz PPDU in accordance with an embodiment.

FIG. 6 is a block diagram of a transmitter for the transmission of a data field in 80 MHz PPDU for the EHT-DUP mode in accordance with an embodiment.

Referring to FIG. 6, a transmitter 100 may include a pre-FEC (forward error correction) PHY padder 101, a scrambler 103, a LDPC encoder 105, a post-FEC PHY padder 107, a stream parser 109, a constellation mapper 111, a LDPC tone mapper 113, a frequency domain duplicator 115, a spatial mapper 117, $N_{TX}$ inverse discrete Fourier transformers (IDFTs) 121, $N_{TX}$ GI inserters 123, and $N_{TX}$ DACs 125. $N_{TX}$ may represent the number of transmit chains.

And then, the LDPC encoder 105 may compute the integer number of LDPC codewords to be transmitted, $N_{CW}$, and the length of the LDPC codewords to be used, $L_{LDPC}$ from the below Table 1 showing the PPDU encoding parameters.

TABLE 1

| Range of $N_{avbits}$ (bits) | Number of LDPC codewords ($N_{CW}$) | LDPC codeword length $L_{LDPC}$ (bits) |
|---|---|---|
| $N_{avbits} \leq 648$ | 1 | 1296, if $N_{avbits} \geq N_{pld}$ + 912 × (1 − R) 648, otherwise |
| $648 < N_{avbits} \leq 1296$ | 1 | 1944, if $N_{avbits} \geq N_{pld}$ + 1464 × (1 − R) 1296, otherwise |
| $1296 < N_{avbits} \leq 1944$ | 1 | 1944 |
| $1944 < N_{avbits} \leq 2592$ | 2 | 1944, if $N_{avbits} \geq N_{pld}$ + 2916 × (1 − R) 1296, otherwise |
| $2592 < N_{avbits}$ | $\left\lceil \dfrac{N_{pld}}{1944 \cdot R} \right\rceil$ | 1944 |

The post-FEC PHY padder 107 may apply a post-FEC PHY padding process on the $N_{CBPS}$ LDPC encoded bits to output post-FEC PHY padded bits.

The stream parser 109 may parse the post-FEC PHY padded bits into $N_{SS}$ spatial stream(s). Since FIG. 6 shows a transmitter with a single spatial stream, the $N_{SS}$ may be 1.

The constellation mapper 111 may perform constellation mapping between bits of the spatial stream and complex constellation points to output complex samples. The constellation mapper 111 may perform dual carrier modulation (DCM) to output a DCM-encoded frequency domain signal. For example, if x represents the pre-DCM frequency domain signal, the DCM-encoded frequency domain signal y may be represented as in the below equation 2.

$$y = [x \ x_{DCM}], \qquad \text{[Equation 2]}$$

where $x_{DCM} = (-1)^{k+N_{SD}} \cdot \times x$ and $k = [0, \ldots, N_{SD}-1]$ The LDPC tone mapper 113 may perform a LDPC tone mapping on the output of the stream parser 109 to output LDPC tone mapped signal.

The frequency domain duplicator 115 may perform the frequency domain duplication on the LDPC tone mapped signal to output frequency domain duplicated signal for the EHT duplicate transmission. For example, the frequency domain duplicator 115 may perform the frequency domain duplication when an EHT PPDU is encoded with EHT-MCS 14. The frequency domain duplicator 115 may output a simple DUP frequency domain signal z=[y y] or a proposed duplicate frequency domain signal z=[y −x $x_{DCM}$] depending on implementations.

The spatial mapper 117 may perform spatial mapping on the output signal of the frequency domain duplicator 115 to output $N_{TX}$ spatial mapped signals for $N_{TX}$ transmit chains.

The $N_{TX}$ inverse discrete Fourier transformers (IDFTs) 121 may be associated with a respective one of $N_{TX}$ transmit chains. Each of the IDFs 110 may perform inverse discrete Fourier transform on a spatial mapped signal to output an OFDM symbol for an associated transmit chain.

The $N_{TX}$ guard interval (GI) inserters 111 may be associated with a respective one of $N_{TX}$ transmit chains. Each of the $N_{TX}$ GI inserters 123 may insert a GI to the OFDM symbol for an associated transmit chain.

The $N_{TX}$ Analog and RF units 112 may be associated with a respective one of $N_{TX}$ transmit chains. Each of the $N_{TX}$ Analog and RF units 112 may convert the OFDM symbol to an analog RF signal.

Figure 7:
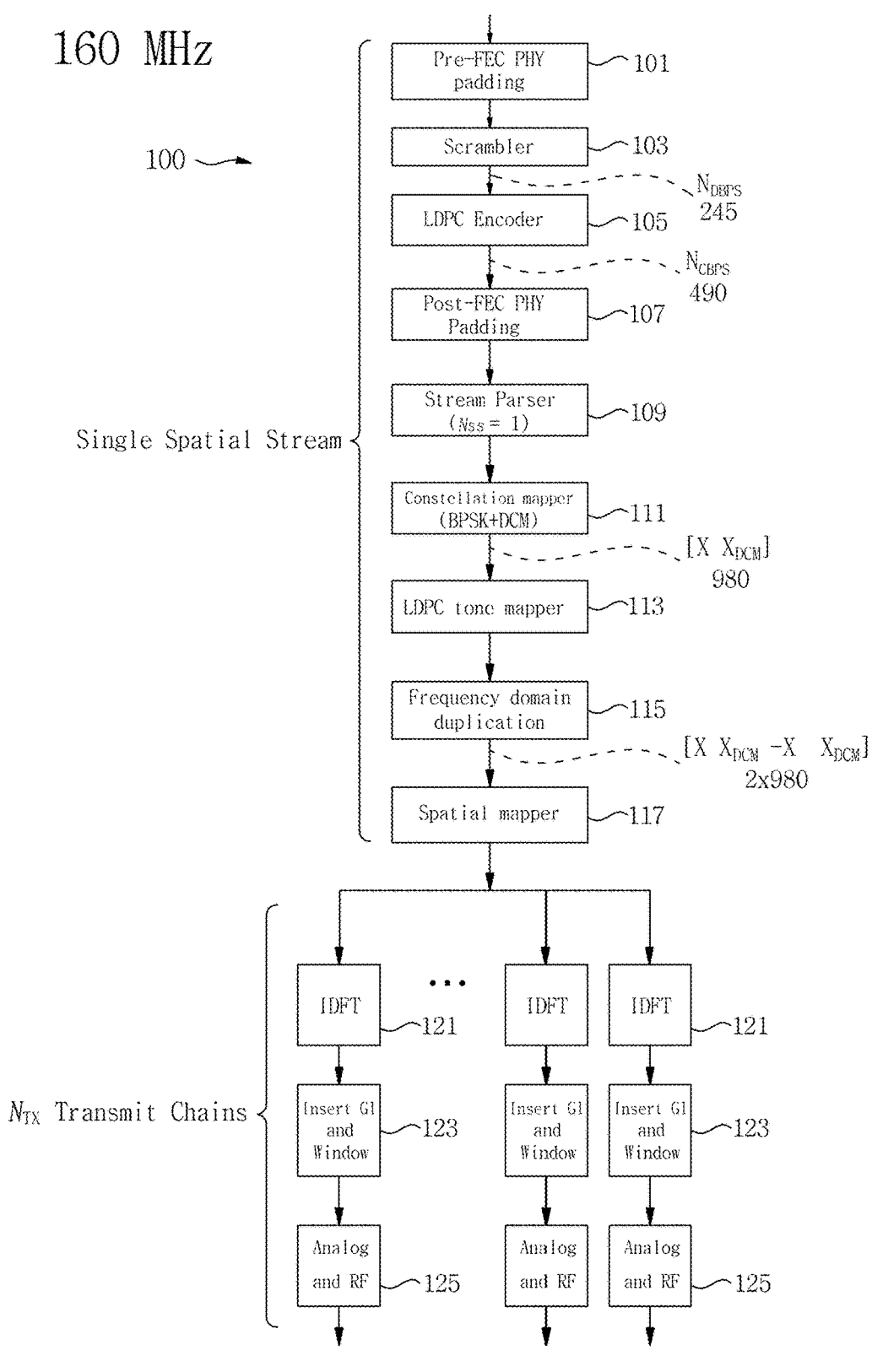
FIG. 7 is a block diagram of a transmitter for the transmission of a data field in 160 MHz PPDU in accordance with an embodiment.

FIG. 7 is a block diagram of a transmitter for the transmission of a data field in 160 MHz PPDU for the EHT-DUP mode in accordance with an embodiment.

Referring to FIG. 7, a transmitter 100 may include a pre-FEC PHY padder 101, a scrambler 103, a LDPC encoder 105, a post-FEC PHY padder 107, a stream parser 109, a constellation mapper 111, a LDPC tone mapper 113, a frequency domain duplicator 115, a spatial mapper 117, $N_{TX}$ inverse discrete Fourier transformers (IDFTs) 121, $N_{TX}$ GI inserters 123, and $N_{TX}$ DACs 125.

Detailed description of elements of the transmitter 100 shown in FIG. 7 will be omitted because detailed description of elements of the transmitter 100 shown in FIG. 6 may be applicable to that of elements of the transmitter 100 shown in FIG. 7 with some exceptions that, for example, in FIG. 7, $N_{DBPS}$ may be 245 and $N_{CBPS}$ may be 490 for the 160 MHz PPDU.

Figure 8:
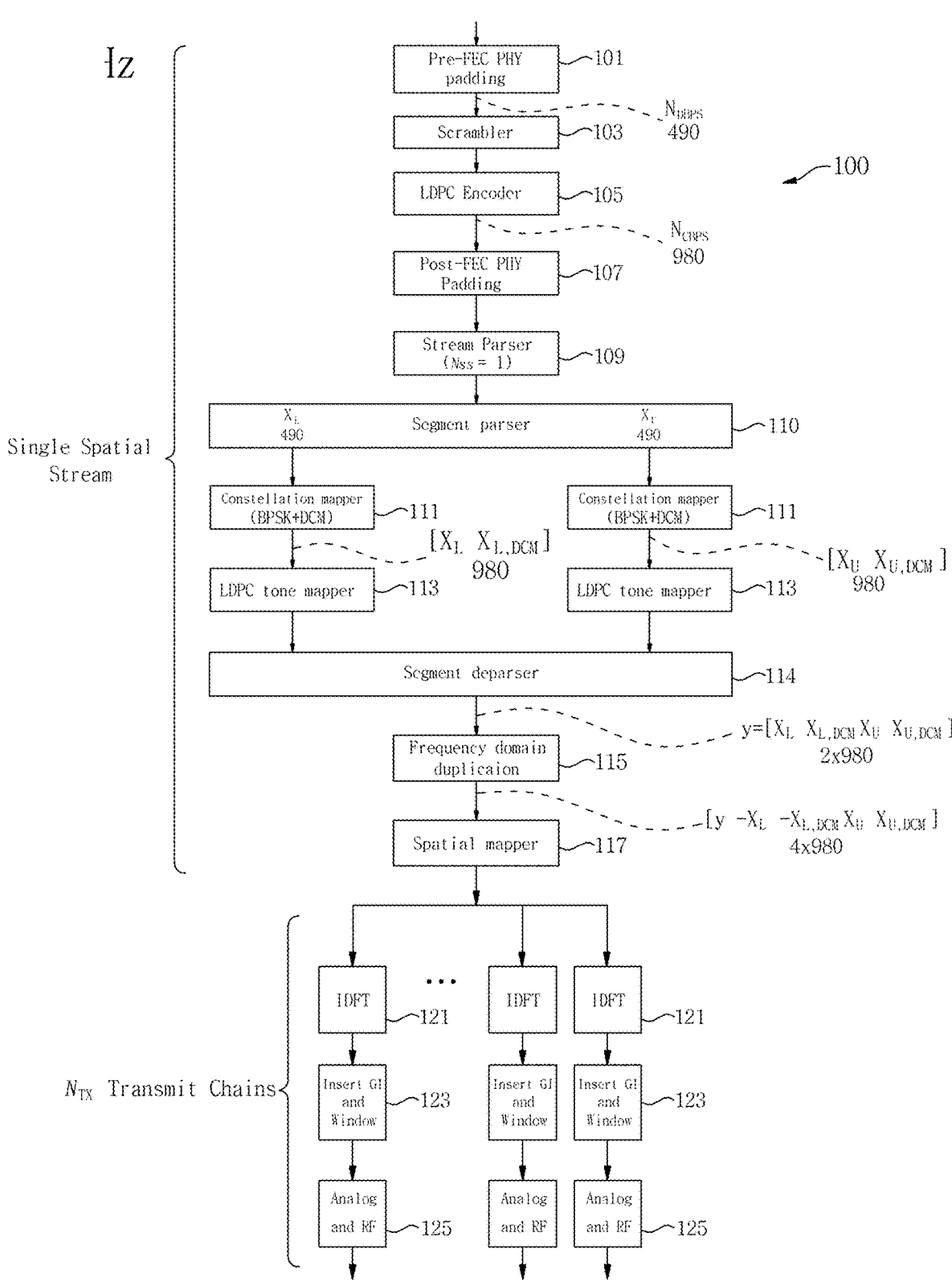
FIG. 8 is a block diagram of a transmitter for the transmission of a data field in 320 MHz PPDU in accordance with an embodiment.

FIG. 8 is a block diagram of a transmitter for the transmission of a data field in 320 MHz PPDU for the EHT-DUP mode in accordance with an embodiment.

Referring to FIG. 8, a transmitter 100 may include a pre-FEC PHY padder 101, a scrambler 103, a LDPC encoder 105, a post-FEC PHY padder 107, a stream parser 109, a segment parser 110, a plurality of constellation mappers 111, a plurality of LDPC tone mapper 113, a segment deparser 114, a frequency domain duplicator 115, a spatial mapper 117, $N_{TX}$ inverse discrete Fourier transformers (IDFTs) 121, $N_{TX}$ GI inserters 123, and $N_{TX}$ DACs 125.

Detailed description of some elements of the transmitter 100 shown in FIG. 8 will be omitted because detailed description of elements of the transmitter 100 shown in FIG. 6 may be applicable to that of some elements of the transmitter 100 shown in FIG. 8. For example, in FIG. 8, $N_{DBPS}$ may be 490 and $N_{CBPS}$ may be 980 for the 320 MHz PPDU.

The segment parser 110 may divide the output of the stream parser 109 into a lower frequency subblock and an upper frequency subblock.

In some embodiments, the plurality of constellation mappers 111 may include a lower constellation mapper and an upper constellation mapper.

The lower constellation mapper may perform constellation mapping between bits of the lower frequency subblock and complex constellation points to output complex samples for the lower frequency subblock over lower $N_{SD}/2$ subcarriers. The lower constellation mapper may perform dual carrier modulation (DCM) to output a DCM-encoded frequency domain signal for the lower frequency subblock. For example, if $x_L$ represents the pre-DCM frequency domain signal for the lower frequency subblock, the DCM-encoded frequency domain signal $y_L$ for the lower frequency subblock may be represented as in the below equation 3.

$$y_L = [x_L \ x_{L,DCM}], \qquad \text{[Equation 3]}$$

$$\text{where } x_{L,DCM} = (-1)^{k+N_{SD}} \cdot \times x_L \text{ and } k = \left[0, \ldots, \frac{N_{SD}}{2} - 1\right]$$

The upper constellation mapper may perform constellation mapping between bits of the upper frequency subblock and complex constellation points to output complex samples for the upper frequency subblock over upper $N_{SD}/2$ subcarriers. The upper constellation mapper may perform dual carrier modulation (DCM) to output a DCM-encoded frequency domain signal for the upper frequency subblock. For example, if $x_U$ represents the pre-DCM frequency domain signal for the upper frequency subblock, the DCM-encoded frequency domain signal $y_U$ for the upper frequency subblock may be represented as in the below equation 4.

$$y_U = [x_U \ x_{U,DCM}], \qquad \text{[Equation 4]}$$

$$\text{where } x_{U,DCM} = (-1)^{k+\frac{3N_{SD}}{2}} \cdot \times x_U \text{ and } k = \left[0, \ldots, \frac{N_{SD}}{2} - 1\right]$$

In some embodiments, the plurality of LDPC tone mapper 113 may include a lower LDPC tone mapper and an upper LDPC tone mapper.

The lower LDPC tone mapper may perform a LDPC tone mapping on the output of the lower constellation mapper to output LDPC tone mapped signal for the lower frequency subblock.

The upper LDPC tone mapper may perform a LDPC tone mapping on the output of the upper constellation mapper to output LDPC tone mapped signal for the upper frequency subblock.

The segment deparser 114 may merge the two frequency subblocks into one frequency segment y=[y_L y_U].

The frequency domain duplicator 115 may perform the frequency domain duplication on the output of the segment deparser 114 to output a frequency domain duplicated signal for the EHT duplicate transmission. For example, the frequency domain duplicator 115 may perform the frequency domain duplication when an EHT PPDU is encoded with EHT-MCS 14. The frequency domain duplicator 115 may output a simple DUP frequency domain signal z=[y y] or a proposed duplicate frequency domain signal z=[y $-x_L$ $-x_{L,DCM}$ $x_U$ $x_{U,DCM}$] depending on implementations The below Table 2 provides pate-dependent parameters for EHT-MCS 14 for EHT DUP mode and $N_{SS,u}$=1. $N_{SS,u}$ represents the number of spatial streams for user u.

TABLE 2

| Modulation | Bandwidth | $R_u$ | $N_{BPSCS,u}$ | $N_{SD,u}$ | $N_{CBPS,u}$ | $N_{DBPS,u}$ | Data rate (Mb/s) | | |
|---|---|---|---|---|---|---|---|---|---|
| | | | | | | | 0.8 µs GI | 1.6 µs GI | 3.2 µs GI |
| BPSK-DCM | 80 MHz | ½ | 1 | 234 | 234 | 117 | 8.6 | 8.1 | 7.3 |
| BPSK-DCM | 160 MHz | ½ | 1 | 490 | 490 | 245 | 18.0 | 17.0 | 15.3 |
| BPSK-DCM | 320 MHz | ½ | 1 | 980 | 980 | 490 | 36.0 | 34.0 | 30.6 |

In Table 2, Ru represents the coding rate for user u, $N_{BPSCS,u}$ represents the number of coded bits per subcarrier per spatial stream for user u, $N_{SD,u}$ represents the effective number of data tones carrying unique data for user u, $N_{CBPS,u}$ represents the number of coded bits per OFDM symbol for user u, and $N_{DBPS,u}$ represents the number of data bits per OFDM symbol for user u.

The EHT-STF, EHT-LTF, and pilot subcarriers for an 80 MHZ EHT MU PPDU transmitted in EHT DUP mode may be constructed in an identical manner to those of an EHT MU PPDU transmitted in OFDMA format with two 484-tone RUs occupied. The EHT-STF, EHT-LTF, and pilot subcarriers for a 160/320 MHz EHT MU PPDU transmitted in EHT DUP mode may be constructed in an identical manner to those of a 160/320 MHz EHT MU PPDU transmitted in non-OFDMA format.

Figure 9:
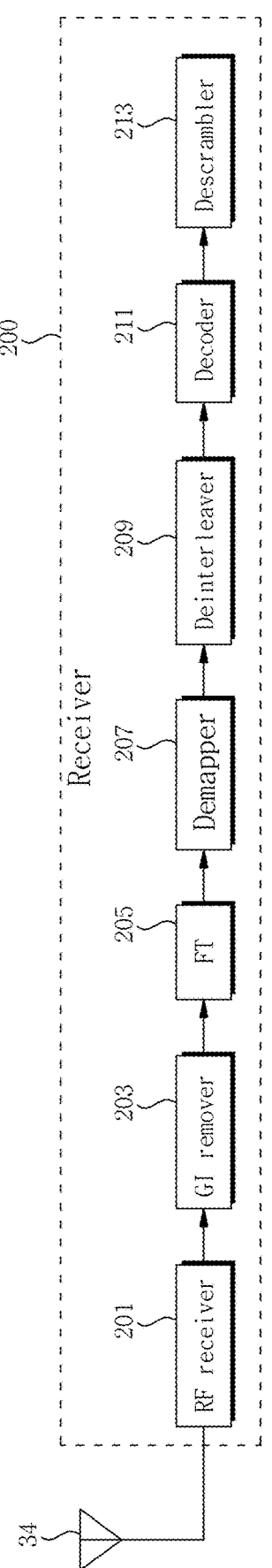
FIG. 9 shows a block diagram of a receiver in accordance with an embodiment.

FIG. 9 shows a block diagram of a receiver in accordance with an embodiment.

Referring to FIG. 9, the receiver 200 in accordance with an embodiment may include a RF receiver 201, a GI remover 203, a Fourier transformer (FT) 205, a demapper 207, a deinterleaver 209, and a decoder 211.

The RF receiver 201 may receive an RF signal via the antenna unit 34 and converts the RF signal into one or more symbols.

The GI remover 203 may remove the GI from the symbol.

The FT 205 may convert the symbol corresponding a time domain block into a block of constellation points by using a discrete Fourier transform (DFT) or a fast Fourier transform (FFT) depending on implementation.

The demapper 207 may demap the block of constellation points to demapped data bits. If the LDPC encoding is used, the demapper 207 may further perform LDPC tone demapping before the constellation demapping.

The deinterleaver 209 may deinterleave demapped data bits to generate deinterleaved data bits. In some embodiments, deinterleaving may be applied when BCC encoding is used.

The decoder 211 may decode the deinterleaved data bits to generate decoded bits. For example, the decoder 211 may be an FEC decoder. The FEC decoder may include a BCC decoder or an LDPC decoder. In order to support the HARQ procedure, the decoder 211 may combine a retransmitted data with an initial data.

The descrambler 213 may descramble the descrambled data bits based on a scrambler seed.

Link adaptation (LA) parameters for WLAN systems may be sent as part of the MAC header. The parameters may be carried in an HT control field in the MAC header. Hereinafter, the format of the MAC frame will be described with reference to FIGS. 10A, 10B, 11, 12, and 13.

FIG. 10A shows the format of the MAC frame in accordance with an embodiment.

Referring to FIG. 10A, the MAC frame may include a MAC header, a Frame body, and an FCS. The MAC header may include a frame control field, a duration/ID field, an address 1 field, an address 2 field, an address 3 field, a sequence control field, an address 4 field, a QoS control field, a HT control field.

FIG. 10B shows the format of the HT Control field in accordance with an embodiment.

Referring to FIG. 10B, the B0 bit of the HT control field may be set to 0 to indicate that the HT control field is an HT variant HT control field including an HT control middle subfield, an AC constraint subfield, and an RDG/More PPDU subfield. The B0 and B1 bits of the HT control field may be set to 1 and 0 to indicate that the HT control field is a VHT variant HT control field including a VHT control middle subfield, an AC constraint subfield, and RDG/More PPDU subfield. The B0 and B1 bits of the HT control field may be set to 1 and 1 to indicate that the HT control field is an HE variant HT control field including an A-Control subfield. The AC Constraint subfield of the HT Control field may indicate whether the mapped access category (AC) of an RD (Reverse Direct) Data frame is constrained to a single AC. The RDG/More PPDU subfield of the HT Control field is interpreted differently depending on whether it is transmitted by an RD initiator or an RD responder.

Figures 11, 12:
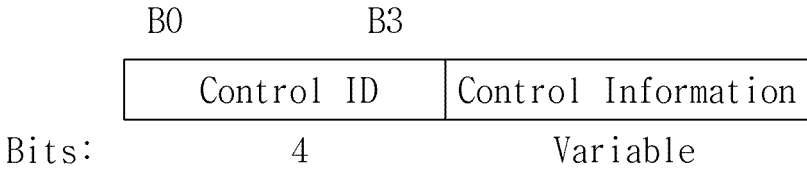
FIG. 11 shows the format of the A-Control subfield of the HE variant HT Control field in accordance with an embodiment.
FIG. 12 shows the format of the Control subfield of the A-Control subfield in accordance with an embodiment.

FIG. 11 shows the format of the A-Control subfield of the HE variant HT Control field in accordance with an embodiment.

Referring to FIG. 11, the A-Control subfield of the HE variant HT Control field may include a control list subfield and padding bits. The A-Control subfield may be fixed 30 bits in length. The control list subfield may have a variable number of bits. The Control List subfield contains one or more control subfields. The format of each Control subfield is shown in FIG. 12.

FIG. 12 shows the format of the Control subfield of the A-Control subfield in accordance with an embodiment.

Referring to FIG. 12, the control subfield of the A-Control subfield may include the control ID subfield and a control information subfield.

The Control ID subfield may indicate the type of information carried in the Control Information subfield. The length of the Control Information subfield may be fixed for each value of the Control ID subfield. The values of the Control ID subfield and the associated length of the Control Information subfield may be defined in Table 3.

TABLE 3

| Control ID value | Meaning | Length of the Control Information subfield (bits) |
|---|---|---|
| 0 | Triggered response scheduling (TRS) | 26 |
| 1 | Operating mode (OM) | 12 |
| 2 | HE link adaptation (HLA) | 26 |
| 3 | Buffer status report (BSR) | 26 |
| 4 | UL power headroom (UPH) | 8 |
| 5 | Bandwidth query report (BQR) | 10 |
| 6 | Command and status (CAS) | 8 |
| 7 | EHT operating mode (EHT OM) | 6 |
| 8 | Single response scheduling (SRS) | 10 |
| 10 | AP assistance request (AAR) | 20 |
| 9, 11-14 | Reserved | |
| 15 | Ones need expansion surely (ONES) | 26 |

As shown in Table 3, for example, the control ID subfield is set to 2 to indicate that the control subfield is a HE link adaptation (HLA) control subfield including the Control Information subfield carrying information related to the HE link adaptation (HLA) procedure.

In some embodiments, the control ID subfield is set to one of the reserved values (9, 11-14) in Table 3 to indicate that the control subfield is a proposed link adaptation control subfield including the Control Information subfield carrying information related to a proposed link adaptation (HLA) procedure which may be named as EHT link adaptation. The Control information subfield in the proposed link adaptation control subfield may be 26 bits in length. The format of the control information subfield in the proposed link adaptation control subfield is shown in FIG. 13.

Figures 13, 14:
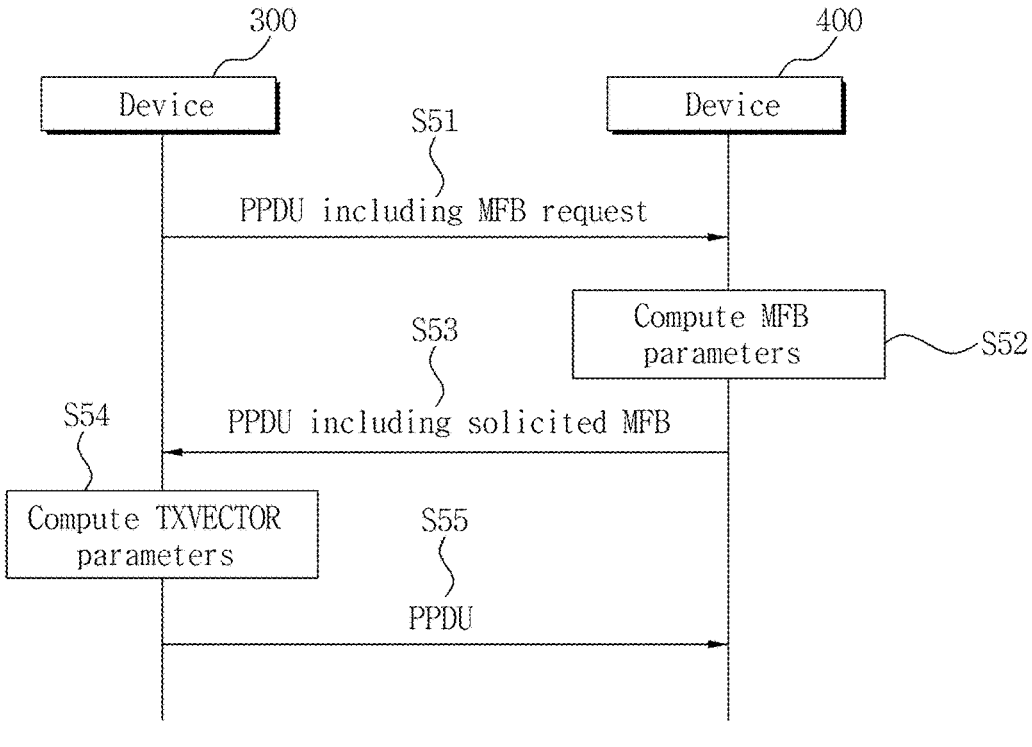
FIG. 13 shows the format of the control information subfield in a link adaptation (LA) control subfield in accordance with an embodiment.
FIG. 14 shows a link adaptation procedure for a solicited MFB in accordance with an embodiment.

FIG. 13 shows the format of the control information subfield in a link adaptation (LA) control subfield in accordance with an embodiment.

Referring to FIG. 13, the control information subfield in the proposed link adaptation (LA) subfield may include, as information related to the link adaptation procedure, an unsolicited MCS feedback (MFB) subfield, a MCS request (MRQ) subfield, an NSS subfield, an MCS subfield, a PS160 subfield, an RU Allocation subfield, a BW subfield, an MSI/Partial PPDU parameters subfield, a Tx Beamforming subfield, a UL TB PPDU MFB subfield, and a BW extension subfield.

The unsolicited MCS feedback (MFB) subfield, the MCS request (MRQ) subfield, the NSS subfield, the MCS subfield, the PS160 subfield, the RU Allocation subfield, the BW subfield, the MSI/Partial PPDU parameters subfield, the Tx Beamforming subfield, the UL TB PPDU MFB subfield, and the BW extension subfield may be, but not limited to, 1, 1, 3, 4, 1, 8, 2, 3, 1, 1, and 1 bit(s) in length, respectively.

The Unsolicited MFB subfield may indicate whether the LA control is an unsolicited MFB. For example, the Unsolicited MFB subfield may be set to 1 if the LA Control is an unsolicited MFB and be set to 0 if the LA Control is an MRQ or a solicited MFB.

The MRQ subfield may be used to request an LA feedback. For example, the MRQ subfield may be set to 1 and the Unsolicited MFB subfield may be set to 0 in the LA Control subfield of a frame to request a link adaptation feedback. The MRQ subfield may be set to 0 and the Unsolicited MFB subfield may be set to 0 to respond to an LA request.

The NSS subfield may indicate a recommended number of spatial streams.

The MCS subfield may indicate a recommended MCS. In some embodiments, the DCM may be indicated with MCS 15. In some embodiments, the DUP mode may be indicated with MCS 14.

The RU Allocation subfield may indicate the RU at which the recommended MCS is applied. The recommended RU may be within an RU or a bandwidth in which the received PPDU is located. The RU Allocation subfield may indicate RU of the recommended MCS/RU specified by the MFB requester to get feedback.

The format of the LA control subfield may contain information for RU allocation and channel bandwidth information to reflect multiple RUs and RUs sizes. For example, to identify the size and the location of the RU or MRU, a first control information may be introduced on top of the RU allocation subfield. The first control information and the RU Allocation subfield may be jointly encoded where the first control information and the first bit of the RU allocation subfield may indicate which 80 MHz subblock is located depending on the bandwidth or RU/MRU sizes. The first control information may indicate which 160 MHz segment is located depending on the bandwidth and RU/MRU sizes. In some embodiments, the B0 bit of the RU Allocation subfield may be set to 0 to indicate that the RU or MRU allocation applies to the primary 80 MHz channel and set to 1 to indicate that the RU allocation applies to the secondary 80 MHz channel in the primary 160 MHz. In some embodiments, the B0 bit of the RU Allocation subfield may be set to 0 to indicate that the RU or MRU allocation applies to the lower 80 MHz in the secondary 160 MHz and may be set to 1 to indicate that the RU allocation applies to upper 80 MHz in the secondary 160 MHz.

The PS160 subfield may indicate the first control information. For example, a second control information may be BW Extension subfield, jointly encoded with BW to indicate 20, 40, 80, 160, and 320 MHz.

The BW subfield may be a bandwidth of the recommended MCS/bandwidth specified by the MFB requester to get feedback. The BW subfield may indicate a bandwidth less than or equal to the bandwidth indicated by the parameter CH_BANDWIDTH.

The UL TB PPDU MFB subfield may indicate that the NSS subfield, the MCS subfield, the BW subfield, the RU Allocation field represent the recommended MFB for the TB PPDU in response.

The MSI/Partial PPDU Parameters subfield may indicate partial parameters of the measured PPDU or an MRQ sequence identifier (MSI). For example, if the Unsolicited MFB subfield is 0 and the MRQ subfield is 1, the MSI/Partial PPDU Parameters subfield may contain a sequence number in the range 0 to 6 that identifies the specific link adaptation feedback request. An MFB responder that sends a solicited MFB shall set the Unsolicited MFB subfield to 0 and MRQ subfield to 0 in the LA Control subfield. If the Unsolicited MFB subfield is 1, the MSI/Partial PPDU Parameters subfield may contain a PPDU Type And Compression Mode subfield and a coding type subfield. The coding type subfield may indicate whether a PPDU is BCC-encoded or LDPC-encoded. The Coding Type subfield may be set to 0 if the parameter FEC_CODING is equal to BCC_CODING and may be set to 1 if that parameter is equal to LDPC_CODING. Instead of the Coding type subfield, a UL/DL subfield may be included in the MSI/Partial PPDU Parameters subfield. The PPDU Type And Compression Mode field may be jointly encoded with the UL/DL subfield to indicate a PPDU type such as DL OFDMA (including non-MU-MIMO and MU-MIMO), DL transmission to a single user or NDP, DL MU-MIMO (non-OFDMA), UL OFDMA or UL non-OFDMA (including non-MU-MIMO and MU-MIMO), and UL transmission to a single user or NDP as shown in the below Table 4.

TABLE 4

| UL/ DL | PPDU Type And Compression Mode | PPDU format | Note |
|---|---|---|---|
| DL | 0 | MU PPDU | DL OFDMA (including non-MU-MIMO and MU-MIMO) |
| DL | 1 | MU PPDU | Transmission to a single user or NDP (Not to AP. Typically "DL") |
| DL | 2 | MU PPDU | DL MU-MIMO (non-OFDMA) |
| UL | 0 | TB PPDU | UL OFDMA or UL non-OFDMA (including non-MU-MIMO and MU-MIMO) |
| UL | 1 | TB PPDU | Transmission to a single user or NDP (To AP, i.e., "UL") |

The Tx Beamforming subfield may be set to 1 if the parameter BEAMFORMED is equal to 1 and may be set to 0 if that parameter is equal to 0.

In 802.11 link adaptation (LA) systems, there are basically two feedback (FB) types, solicited FB and unsolicited FB. Hereinafter, the link adaptation procedure will be described with reference to FIG. 14 and FIG. 15.

FIG. 14 shows a link adaptation procedure for a solicited MFB in accordance with an embodiment.

At S51, the electronic device 300 acting as an MFB requester may send a first PPDU containing the LA control subfield indicating a MFB request to request an MCS feedback.

In some embodiments, in the LA control subfield of the first PPDU, the MRQ subfield may be set to 1 and the Unsolicited MFB subfield may be set to 0 to send the MFB request in the first PPDU. In each MFB request, the MFB requester may set the MSI/Partial PPDU Parameters subfield to a value ranging from 0 to 6 as the MRQ sequence identifier. In some embodiments, how to choose the MSI value may depends on the implementations.

At S52, the electronic device 400 acting as an MFB responder may, based on the same RU of the first PPDU carrying the MFB request, compute MFB parameters such as a recommended MCS, a recommended NSS, and a recommended DCM of the RU and BW specified in the MFB request. The electronic device 400 may compute the MFB parameters from the frame the LA control subfield indicating the MFB request.

At S53, the electronic device 400 may send a second PPDU containing the LA control subfield indicating a solicited MCS feedback including the computed MFB parameters. In some embodiments, in the LA control subfield of the second PPUD, both the MRQ subfield and the Unsolicited MFB subfield may be set to 0 to indicate the MFB, the MCS subfield may indicate the recommended MCS and the recommended DCM, and the NSS subfield may indicate a recommended NSS.

In some embodiments, the MRQ sequence identifier indicated by the MSI/Partial PPDU Parameters subfield of the LA control subfield of the second PPUD may be set equal to a value of the MRQ sequence identifier indicated by the MSI/Partial PPDU Parameters subfield of the LA control subfield of the first PPUD.

In some embodiments, the appearance of more than one instance of an LA Control subfield with the MRQ field equal to 1 within a single PPDU may be interpreted by the electronic device 400 as a single request for link adaptation feedback. The electronic device 300 may specify the RU/MRU (e.g. RU subfield and PS160 subfield) and BW (e.g. BW subfield and BW extension subfield) requesting the link adaptation feedback. On receipt of an LA Control subfield with the MRQ subfield equal to 1, the receiver may compute the MCS and NSS of the RU/MRU and BW specified in the MRQ, and these estimates may be based on the same RU/MRU of the PPDU carrying the MRQ. The PPDU carrying MRQ may include the RU/MRU requested for MFB. The electronic device 400 may label the result of this computation with the MSI value from the LA Control subfield in the received frame carrying the MRQ. The electronic device 400 may include the received MSI value in the MSI field of the corresponding response frame. In the case of a delayed response, this allows the electronic device 300 to associate the MFB with the soliciting MRQ. Between the PPDUs carrying the same MSI in either preamble or LA Control subfield, the PPDU carrying the different MSI associated with the same STA may be transmitted.

In some embodiments, for either a solicited or an unsolicited response, the recommended MCS and NSS subfields of LA Control subfield may be selected from the MCS and NSS set supported by the recipient STA.

In some embodiments, the MCS subfield of HLA Control subfield may be the recommended data rate, for given transmission properties carried in the RXVECTOR of the PPDU used for MFB estimation, which results in an estimated frame error rate of 10% or lower for an MPDU length of 3895 octets.

In some embodiments, if the MFB requester sets the MRQ subfield to 1 and sets the MSI subfield to a value that matches the MSI subfield value of a previous request for which the responder has not yet provided feedback, the responder may discard or abandon the computation for the MRQ that corresponds to the previous use of that MSI subfield value and start a new computation based on the new request.

In some embodiments, a STA may respond immediately to a current request for MFB with a frame containing an MSI field value and NSS, and MCS subfields that correspond to a request that precedes the current request.

In some embodiments, a non-AP STA may set the UL TB PPDU MFB to 1 in the LA Control field it transmits to the AP to indicate that the NSS, MCS, BW, and RU Allocation in the LA Control field represent the recommended MFB for the TB PPDU sent from the non-AP STA. The AP may not exceed the recommended RU size indicated in the most recently received RU Allocation field of the LA Control field when it sends a triggering frame addressed to the STA.

In some embodiments, the combination of the MCS subfield and the NSS subfield may indicate whether the electronic device 400 is providing feedback for the request that had the MSI value indicated by the MSI subfield.

In some embodiments, the electronic device 400 may set the MCS subfield, the NSS subfield and the MSI subfield to predetermined values to indicate that the electronic device 400 will not provide feedback for the request that had the MSI value indicated by the MSI subfield. In some embodiments, one or more predetermined combinations of MCS, NSS, and MSI can be used. For example, when MCS, NSS, and MSI are equal to A, B, and 0-N, respectively, it may indicate that the electronic device 400 will not provide feedback for the request that had the MSI value. N may be depending on the size of MSI subfield. For example, the value A may be 14 which is used to indicate frequency duplicate mode (DUP mode) for other control field in either PHY or MAC. MCS 14 in LA control subfield may indicate that the electronic device 400 will not provide feedback for the request that had the MSI value when DUP mode is not valid for either Link adaptation or HARQ. For example, B may be 7. When B is 0 to 6, it may indicate the predefined NSS.

In some embodiments, the electronic device 400 may set the MCS subfield, the NSS subfield and the MSI subfield to values to indicate that the electronic device 400 is providing feedback for the request that had the MSI value. For example, when MCS and NSS are set equal to valid values and MSI is set equal to 0-N, it may indicate that the electronic device 400 is providing feedback for the request that had the MSI value. The MSI value in the response frame matches the MSI value of the MRQ request. N may be depending on the size of MSI subfield.

In some embodiments, invalid combination of BW subfield and extended BW subfield may be used to indicate that the electronic device 400 will not provide feedback for the request that had the MSI value indicated by the MSI subfield.

Assuming all the values of MCS allowed in the MCS subfield are used to indicate different MCSs, and the number of NSS needs more states to indicate up to 16 spatial stream, other subfields need to be used to indicate this. In some embodiments, instead of MCS or NSS, invalid combination of RU/MRU indication and MSI may be used to indicate that the electronic device 400 will not provide feedback for the request that had the MSI value indicated by the MSI subfield. For example, it is indicated with one of reserved states as below.

indicated by the B1 to B7 bits of the RU allocation subfield is any one between 107 and 127, it may indicate that the electronic device 400 will not provide feedback for the request that had the MSI value indicated by the MSI subfield.

At S54, the electronic device 300 may compute TXVECTOR parameters such as the appropriate MCS, DCM and NSS based on the received MFB parameters.

At S55, the electronic device 300 may transmit a third PPDU based on the computed transmission parameters.

In some embodiments, when the preamble of the third PPDU includes the identification information associated to HARQ procedure, the same MSI value may be carried. For example, when the electronic device 400 failed to decode an HARQ unit in the first PPDU and the third PPDU retransmits the HARQ unit, the MSI indicated by MSI/Partial PPDU Parameters subfield in the third PPDU may be equal to the MSI indicated by MSI/Partial PPDU Parameters subfield in the first PPDU.

Figure 15:
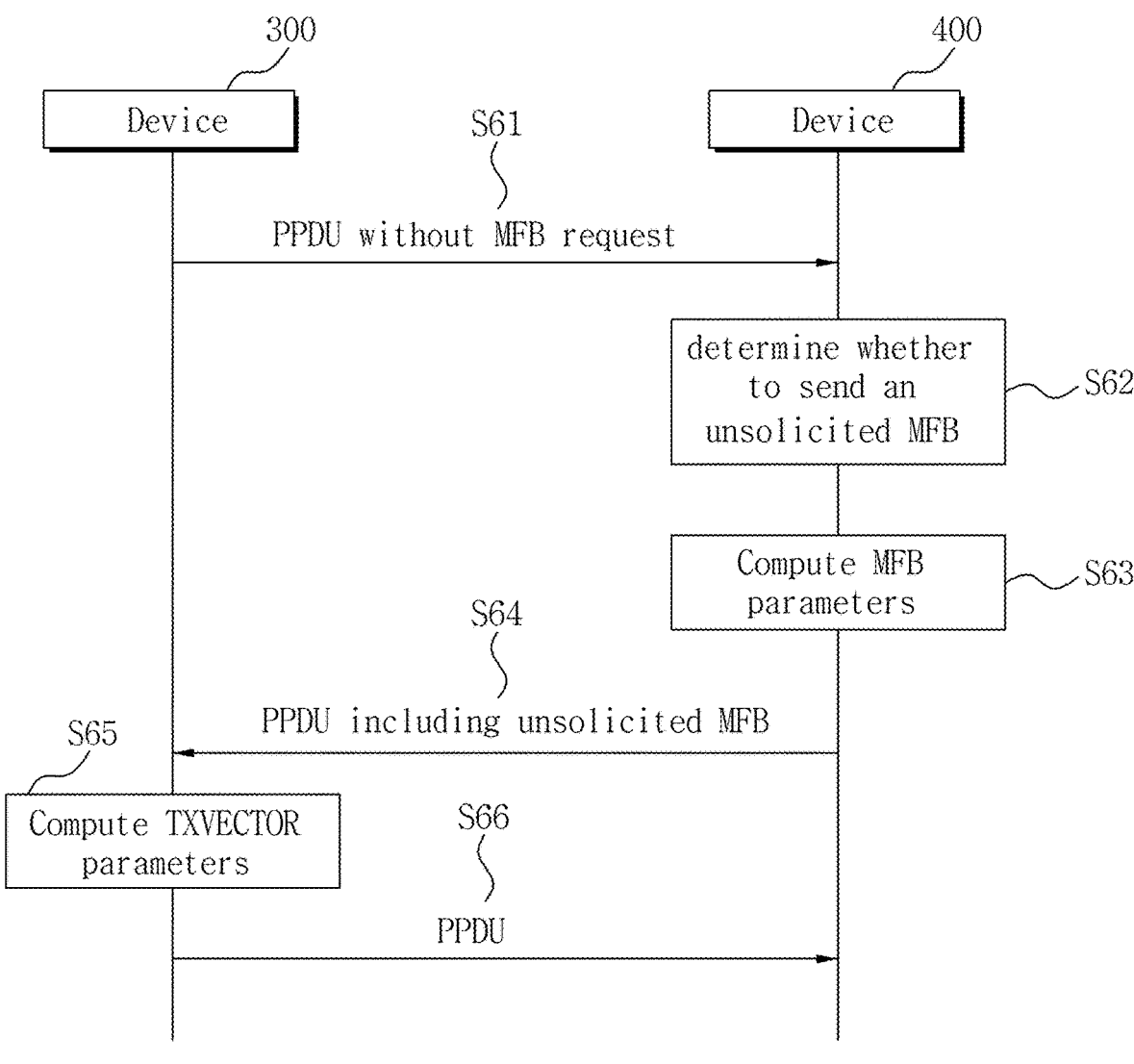
FIG. 15 shows a link adaptation procedure for an unsolicited MFB in accordance with an embodiment.

FIG. 15 shows a link adaptation procedure for an unsolicited MFB in accordance with an embodiment.

At S61, the electronic device 300 may send a first PPDU without any MFB request.

At S62, the electronic device 400 may determine whether to send an unsolicited MFB. It may be totally the electronic device 400's choice.

At S63, when the electronic device 400 determine to send the unsolicited MFB, the electronic device 400 may compute MFB parameters such as a recommended MCS, a recommended NSS, a recommended DCM, a recommended BW, and a recommended RU. Unsolicited MCS, NSS, DCM, BW, and RU estimates to be reported in an LA control subfield sent by the electronic device 400 may be computed based on the most recent PPDU received by the electronic device 400 that matches the description indicated by the PPDU format, Tx Beamforming, and Coding Type subfields in the same Control subfield.

TABLE 5

| PS160 subfield | B0 of the RU Allocation subfield | B7-B1 of the RU Allocation subfield | Bandwidth (M) | RU or MRU size | RU or MRU index | PHY RU or MRU index |
|---|---|---|---|---|---|---|
| 0 | 0 | 105,106 | 320 | 3 × 996 + 484 | MRU1 and MRU2, respectively | MRU index |
| 0 | 1 | | | | MRU3 and MRU4, respectively | |
| 1 | 0 | | | | MRU5 and MRU6, respectively | |
| 1 | 1 | | | | MRU7 and MRU8, respectively | |
| Any | Any | 107-127 | 20, 40, 80, 160 or 320 | Reserved | Reserved | Reserved |

NOTE 1-
B0 of the RU Allocation subfield is set to 0 to indicate that the RU or MRU allocation applies to the primary 80M channel and set to 1 to indicate that the RU allocation applies to the secondary 80M channel in the primary 160M. B0 of the RU Allocation subfield is set to 0 to indicate that the RU or MRU allocation applies to the lower 80M in the secondary 160 M and is set to 1 to indicate that the RU or MRU allocation applies to upper 80M in the secondary 160M.
NOTE 2-
The PHY MRU index of a 52 + 26-tone MRU is not defined in the case of the MRU index equal to 1, 6, 7, or 12, if the bandwidth indicates 80, 160, or 320M. The PHY MRU index of a 106 + 26-tone MRU is not defined in the case of the MRU index equal to 2, 3, 6, or 7, if the bandwidth indicates 80, 160, or 320M.

Table 5 shows encoding of PS160 and RU Allocation subfields in an EHT variant User Info field in accordance with an embodiment. As shown in Table 5, if the state At S64, the electronic device 400 may send a second PPDU containing the LA control subfield indicating the unsolicited MCS feedback including the computed MFB parameters. For example, in the LA control subfield of the second PPDU, the Unsolicited MFB subfield may be set to 1 to indicate the unsolicited MFB, the MCS subfield may indicate the recommended MCS and the recommended DCM, the NSS subfield may indicate a recommended NSS, the RU Allocation subfield may indicate the recommended RU, and the BW subfield may indicate the recommended bandwidth. The parameters, such as a PPDU Format, a Coding Type, and Tx Beamforming, indicated by the MSI/Partial PPDU Parameters subfield and the Tx Beamforming subfield of the LA control subfield of the second PPDU, may be set to match RXVECTOR parameters of the first PPUD which the electronic device 400 compute the unsolicited MFB parameters based on. The second PPDU may carry those parameters because the electronic device 300 has no MSI to identify a PPDU which the electronic device 400 measured to compute the MFB parameters. The PPDU format subfield indicating the PPDU format may be set and encoded as shown in Table 4.

At S65, the electronic device 300 may compute TXVEC-TOR parameters such as the appropriate MCS, DCM, NSS, RU, and BW based on the received MFB parameters.

At S66, the electronic device 300 may transmit a third PPDU based on the computed transmission parameters.

Hereinafter, the HARQ procedure in accordance with various embodiments will be described with reference to FIG. 16 to FIG. 28.

With the requirements on enhanced reliability and reduced latency, a new amendment in WLAN has decided to support Hybrid Automatic Repeat Request (HARQ). So far in 11ax, the WLAN systems use a conventional automatic repeat request (ARQ) procedure that merely relies on the retransmission procedure in the perspective of a MPDU unit when a transmitter does not receive an acknowledgement from a receiver. In this conventional automatic repeat request (ARQ) approach, when the receiver failed to decode MPDUs, it discards those MPDUs before receiving the new retransmitted one.

For HARQ units to be considered, A-MPDU and LDPC codeword will be described with reference to FIG. 16 to FIG. 21.

FIG. 16 shows A-MPDU format in accordance with an embodiment.

Referring to FIG. 16, an A-MPDU may include, or consist of, a sequence of one or more A-MPDU subframes and an EOF padding subframes subfield. The EOF padding subframes subfield may include a variable amount of EOF padding.

FIG. 17 shows the structure of the A-MPDU subframe in accordance with an embodiment.

Referring to FIG. 17, each A-MPDU subframe may include, or consist of, an MPDU delimiter optionally followed by an MPDU. Each non-final A-MPDU subframe may contain up to 3 bytes of padding octets appended to the end of the A-MPDU subframe to make the A-MPDU subframe a multiple of 4 octets in length. The content of these octets may be unspecified.

FIG. 18 shows the structure of the EOF Padding field in accordance with an embodiment.

Referring to FIG. 18, the EOF padding subframes subfield may include, or consist of, zero or more EOF padding subframes. An EOF padding subframe is an A-MPDU subframe with 0 in the MPDU Length field and 1 in the EOF field of the MPDU delimiter shown in FIG. 19.

FIG. 19 shows the structure of an MPDU delimiter in accordance with an embodiment.

Referring to FIG. 19, an MPDU delimiter in accordance with an embodiment may be 4 octets in length, and may include, or consist of, an EOF field, a Reserved field, an MPDU Length field, a CRC field, and a delimiter signature field. The CRC field may be used as a frame check sequence (FCS) to protect the Reserved and MPDU Length fields. Sizes and description for fields of the MPDU delimiter are shown in the below Table 6.

TABLE 6

| Field | Size (bits) | Description |
|---|---|---|
| EOF | 1 | End of frame indication. Set to 1 in an A-MPDU subframe that has 0 in the MPDU Length field and that is used to pad the A-MPDU in a VHT PPDU as described in 10.12.6 (A-MPDU padding for VHT PPDU or S1G PPDU(11ah)). Set to 1 in the MPDU delimiter of an S-MPDU(11ah) as described in 10.12.7 (Setting the EOF field of the MPDU delimiter). Set to 0 otherwise. |
| Reserved | 1 | |
| MPDU Length | 14 | Length of the MPDU in octets. Set to 0 if no MPDU is present. An A-MPDU subframe with 0 in the MPDU Length field is used as defined in 10.12.3 (Minimum MPDU Start Spacing field) to meet the minimum MPDU start spacing requirement and also to pad the A-MPDU to fill the available octets in a VHT PPDU as defined in 10.12.6 (A-MPDU padding for VHT PPDU or S1G PPDU(11ah)). |
| CRC | 8 | 8-bit CRC of the preceding 16 bits. |
| Delimiter Signature | 8 | Pattern that can be used to detect an MPDU delimiter when scanning for an MPDU delimiter. The unique pattern is 0x4E (see NOTE below). |

NOTE
The ASCII value of the character 'N' was chosen as the unique pattern for the value in the Delimiter Signature field.

Figure 20:
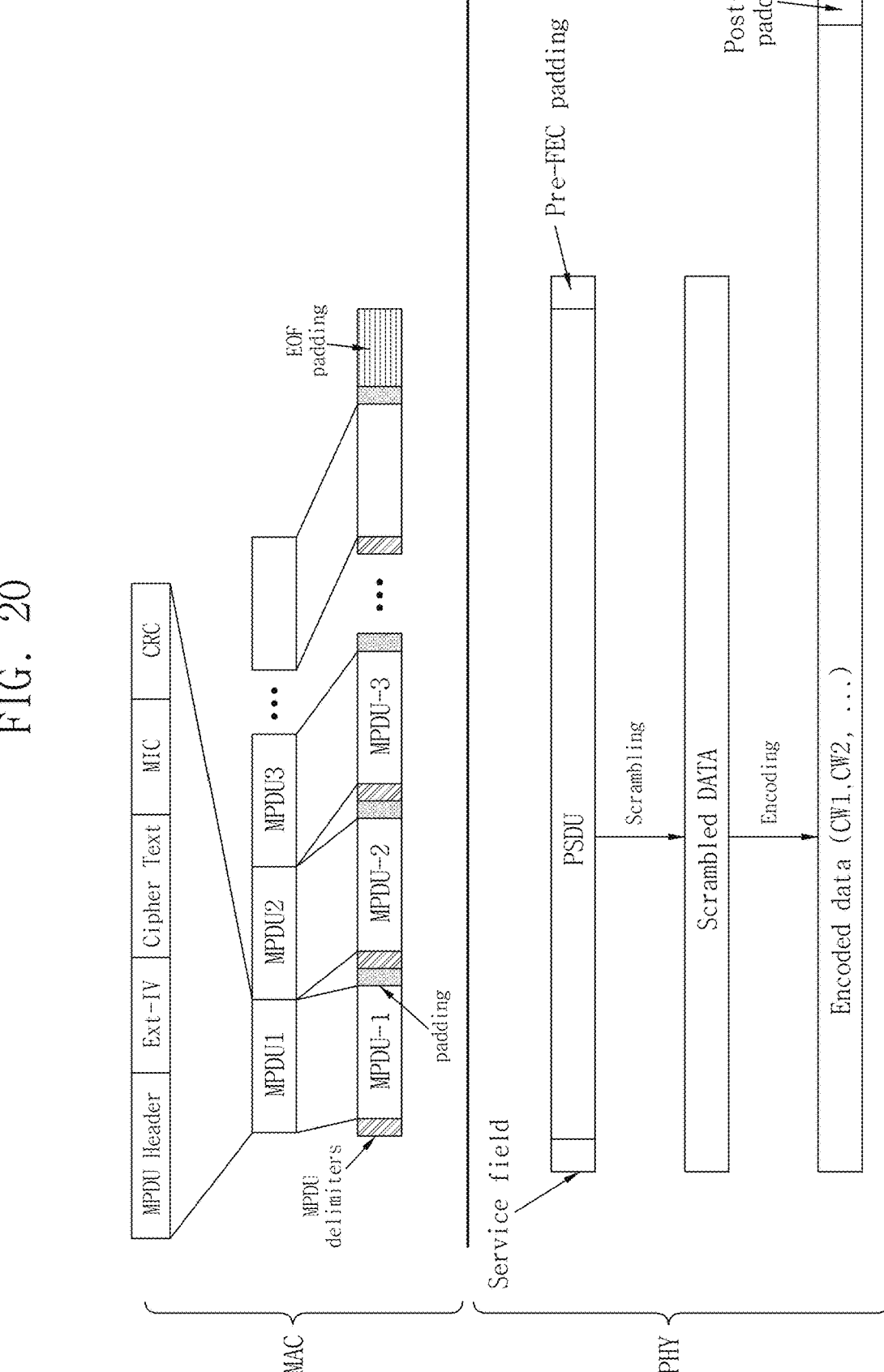
FIG. 20 shows the general transmit procedure from MAC to PHY in accordance with an embodiment.

FIG. 20 shows the general transmit procedure from MAC to PHY in accordance with an embodiment.

Referring to FIG. 20, a MAC entity may generate an A-MPDU including a plurality of A-MPDU subframes and send the A-MPDU to a PHY entity.

The PHY entity may generate a PSDU including a service field, the A-MPDU, and a pre-FEC padding.

And then, the PHY entity may scramble the PSDU to generate scrambled data.

the PHY entity may encode the scrambled data to generate encoded data including a plurality of LDPC codewords.

As shown in FIG. 20, there is no specific mapping rule so far between MPDUs and LDPC codewords because the PHY entity does not need to know about MPDUs and the MAC entity does not need to know about LDPC codewords. There have been no issues even though the PHY entity and the MAC entity do not know about how MPDUs are mapped to CWs, because the MPDU is an operational unit only for the MAC entity and the LDPC codeword is an operational unit only for the PHY entity.

In order for the WLAN to support the HARQ, a new method to align an initial LDPC codeword and retransmitted codeword may be introduced. The HARQ operation is basically operated by the PHY layer to combine the retransmitted data into the initial transmitted data to improve the decoding performance. This misalignment of CWs in retransmitted MPDUs may make combining process impossible.

Figure 21:
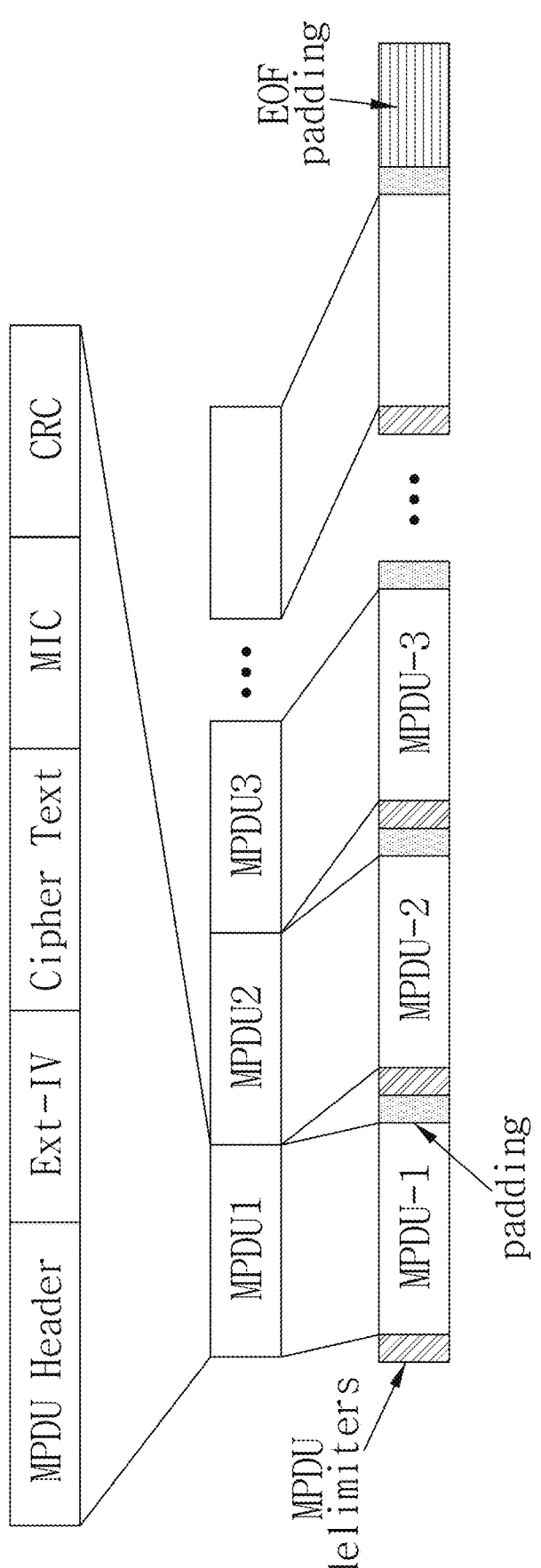
FIG. 21 shows A-MPDU format in accordance with an embodiment.

FIG. 21 shows A-MPDU format in accordance with an embodiment.

As shown in FIG. 21, a MPDU may include a MPDU header, Ext-IV, a cipher text, a MIC, and a CRC. When the HARQ procedure is based on MPDU level, parameters in the MPDU such as the MPDU header, the Ext-IV, the cipher text, the MIC, and the CRC can be potentially mismatched between an initial MPDU and a retransmitted MPDU. If the retransmitted MPDU carries different parameters from the initial MPDU, these changed parameters may cause the different payload at the PHY level and there is no way that the PHY entity can know the changes during the initial transmission and retransmissions in HARQ procedure. This misalignment may make it impossible to perform Log-Likelihood Ratio (LLR) combining for the retransmitted MPDU at the PHY level directly.

FIG. 22 shows an HARQ procedure in accordance with an embodiment.

Referring to FIG. 22, an electronic device 300 may transmit a data unit PPDU1 to an electronic device 400 at S110. In some embodiments, the data unit PPDU1 may include a plurality of HARQ units. In some embodiments, each of the plurality of HARQ units may be a LDPC codeword. In some embodiments, each of the plurality of HARQ units may be a group of one or more LDPC codewords. In some embodiments, each of the plurality of HARQ units may be an MPDU. In some embodiments, each of the plurality of HARQ units may be a group of one or more MPDUs. In some embodiments, each of the plurality of HARQ units may be a newly defined unit other than the LDPC codeword and the MPDU.

At S120, the electronic device 400 may detect which HARQ unit fails to be successfully decoded. The electronic device 400 may store HARQ units which failed to be successfully decoded.

At S130, the electronic device 400 may transmit a data unit PPDU2 in response to the data unit PPDU1 to the electronic device 400. In some embodiment, the data unit PPDU2 may include a HARQ-related information indicating which HARQ unit fails to be decoded. The HARQ-related information in the data unit PPDU2 may be referred to as HARQ feedback information.

In some embodiment, the HARQ-related information may be carried in a MAC frame of the data unit PPDU2.

In some embodiment, the HARQ-related information may be carried in the PHY preamble of the data unit PPDU2.

At S140, the electronic device 300 may transmit a data unit PPDU3 in response to the data unit PPDU2 to the electronic device 400. The data unit PPDU3 may include zero or more HARQ units. In some embodiment, the data unit PPDU3 may include HARQ-related information. In some embodiment, the PHY preamble of the data unit PPDU3 may include a part of the HARQ-related information or compressed information of the HARQ-related information since there are potential delay between transmission and retransmission. In some embodiment, the HARQ-related information field may include identification information to indicate whether the data unit PPDU3 contains one or more retransmitted HARQ unit, control information to indicate which HARQ unit(s) are retransmitted in the data unit PPDU3, or both.

In some embodiment, a scrambler seed used for scrambling the data unit PPDU3 may be equal to a scrambler seed used for scrambling the data unit PPDU1. For example, if the same identification is explicitly carried in the preambles of the data unit PPDU1 and the data unit PPDU3, then the same scrambler seed in the first transmitted data unit PPDU1 may be reused as a scrambler seed for the data unit PPDU3. For example, this identification may be used as scrambler seed.

Another approach is to refer to the user specific information which is the implicit way. In some embodiments, a partial STA-ID may be used for a scrambler seed. In some embodiments, the MSI may be used for a scrambler seed because its value may be the same for the same data information.

In some embodiments, the identification information field may be included in a preamble portion of PPDUs depending on the sequence associated for HARQ procedure. For example, the identification information field may be included in a preamble portion of the data unit PPDU3.

In some embodiments, the identification information field may be included in a MAC portion of PPDUs depending on the sequence associated for HARQ procedure. For example, the identification information field may be included in a MAC frame of the data unit PPDU3.

In some embodiments, a value of the identification information field may be an integer ranging 0 to $2^N-1$ where N is the size of a field containing the identification information. It keeps the same value to indicate the retransmitted HARQ units for the first user.

The identification information may be a different value for the first user when the following PPDU does not carry the retransmitted data.

For multiple users such as a second user and a third user, different values for the identification information may be assigned to each user. For example, a value of the identification information assigned to the second user may be different from a value of the identification information assigned to the third user.

For multiple user such as a fourth user and a fifth user, same identification information for each user may be assigned. For example, a value of the identification information assigned to the fourth user may be the same as a value of the identification information assigned to the fifth user. In this case the identification information may be independently considered for each user such that STA-ID and the identification information is jointly encoded to show whether it is retransmitted information.

In case an MRQ sequence identifier (MSI) is carried in the link adaptation (LA) control subfield in MAC layer, the identification information in either PHY or MAC may carry the same value of MSI field. The retransmitted information may be decided with the recommended MCS in LA control field.

In some embodiments, lengths of all HARQ units in PPDUs are identical during an HARQ procedure. In some embodiments, lengths of all HARQ units in the data unit PPDU1 or PPDU3 are identical. In some embodiments, the length of HARQ units in the data unit PPDU3 is the same as the length of HARQ units in the data unit PPDU1.

In some embodiments, lengths of HARQ units may be different for different PPDUs during an HARQ procedure. In some embodiments, a length of a HARQ unit in the data unit PPDU1 may be allowed to be different from a length of another HARQ unit in the data unit PPDU1. In some embodiments, a length of a HARQ unit in the data unit PPDU3 may be allowed to be different from a length of another HARQ unit in the data unit PPDU3. In some embodiments, a length of one or more HARQ units in the data unit PPDU3 may be allowed to be different from a length of one or more HARQ units in the data unit PPDU1.

At S150, the electronic device 400 may combine the retransmitted HARQ unit with the previously stored HARQ unit.

Hereinafter, the HARQ-related information will be described.

In some embodiment, the HARQ-related information may be carried in the PHY of the data unit PPDU3. For example, the HARQ-related information may be carried in the preamble of the data unit PPDU3. In some embodiments, the preamble may include a SIG field dedicated to the HARQ procedure and this SIG field may be included in the PPDU which retransmits the HARQ unit. Comparing to initial transmission, it may carry the same MSI information (e.g., any identification information) where the location carrying the MSI information may be different. In some embodiments, the data units PPDU1 and PPDU3 may carry the same MSI information, but the location carrying the MSI information in the data unit PPDU1 may be different from the location carrying the MSI information in the data unit PPDU3. For example, the MSI information in the data unit PPDU1 may be carried on the MAC header but the MSI information in the data unit PPDU3 may be carried in the SIG field of the PHY preamble of the data unit PPDU3.

In some embodiment, the HARQ-related information carried in the data unit PPDU3 may be the same as the HARQ-related information carried in the data unit PPDU2. In some embodiment, the HARQ-related information carried in the data unit PPDU3 may be a part or a subset of the HARQ-related information carried in the data unit PPDU2.

In some embodiment, the HARQ-related information may be carried in a MAC frame of PPDU2 and all or part of the HARQ-related information carried in the data unit PPDU2 may be carried in the PHY preamble of PPDU3 since MAC is capable of more room. Then the electronic device 300 may be allowed to choose which HARQ unit should be carried and processed when it is retransmitted at the electronic device 400 first. The HARQ-related information in the data unit PPDU3 may be a subset of the HARQ-related information in the data unit PPDU2. For example, first N HARQ units (e.g., CWs or MPDUs) may be retransmitted with the HARQ-related information in the SIG field in the PHY preamble of the data unit PPDU3 in response to the data unit PPDU2.

In some embodiments, the HARQ-related information may be carried in the PHY preamble of the data unit PPDU2 and all or part of the HARQ-related information in the data unit PPDU2 may be carried in the PHY preamble of the data unit PPDU3. In order to carry enough amount of the HARQ-related information, WLAN system may support a PPDU type with no data field wherein HARQ-related information is carried in the SIG field instead of a MAC frame of the data unit PPDU3. Then the electronic device 300 may be allowed to choose which HARQ unit should be carried and processed when it is retransmitted at the electronic device 400 first. The HARQ-related information in the data unit PPDU3 may be a subset of the HARQ-related information in the data unit PPDU2. For example, first N HARQ units (e.g., CWs or MPDUs) may be retransmitted with the HARQ-related information in the SIG field in the PHY preamble of the data unit PPDU3 in response to the data unit PPDU2. Or the HARQ-related information may indicate that all requested HARQ units are retransmitted. In this case, the electronic device 300 may transmit a data unit PPDU4 including retransmitted HARQ units after the data unit PPDU3 is transmitted and the electronic device 400 may decode the retransmitted HARQ units with parameters in the SIG field of the data unit PPDU4. In some embodiments, parameters in the SIG field of the data unit PPDU4 may be equal to or different from parameters in the SIG field of the data unit PPDU2. In some embodiments, the data unit PPDU4 may be received a SIFS after receiving the data unit PPDU3

In some embodiments, the HARQ-related information may be carried in the PHY preamble of the data unit PPDU2 and all or part of the HARQ-related information in the data unit PPDU2 may be carried in the PHY preamble of the data unit PPDU3. In order to carry enough amount of the HARQ-related information, WLAN system may support a PPDU format with a certain type of a SIG field wherein the HARQ-related information is carried in this type of the SIG field instead of a MAC frame of the data unit PPDU3 and the type of SIG field does not include parameters to be used to decode the data field including retransmitted HARQ units. In some embodiments, the type or format of the SIG field may be different from that of the L-SIG field, different from that of the U-SIG field, and be different from that of EHT-SIG field. Then the electronic device 300 may be allowed to choose which HARQ unit should be carried and processed when retransmitted data is carried in PPDU3. The HARQ-related information in the data unit PPDU3 may be a subset of the HARQ-related information in the data unit PPDU2. For example, first N HARQ units (e.g., CWs or MPDUs) may be retransmitted with the HARQ-related information in the SIG field in the PHY preamble of the data unit PPDU3 in response to the data unit PPDU2. Or the HARQ-related information may indicate that all requested HARQ units are retransmitted. In this case, since this type of the SIG field includes HARQ-related information without parameters to be used to correctly decode the data field including the retransmitted HARQ units, the electronic device 400 may assume that parameters to be used to decode the data field of the data unit PPDU3 is the same as parameters in the SIG field of the data unit PPDU1 and decode the data field of the data unit PPDU3 with parameters in the SIG field of the data unit PPDU1.

In some embodiments, the HARQ-related information may be carried in the PHY preamble of the data unit PPDU2 and all or part of the HARQ-related information in the data unit PPDU2 may be carried in the PHY preamble of the data unit PPDU3. In order to carry enough amount of the HARQ-related information, WLAN system may support a PPDU format with a certain type of a SIG type wherein the HARQ-related information is carried in this type of the SIG field instead of a MAC frame of the data unit PPDU3 and the type of the SIG field includes parameters to be used to decode the data field including retransmitted HARQ units. Then the electronic device 300 may be allowed to choose which HARQ-related information should be carried and processed when retransmitted data is carried in the data unit PPDU3. The HARQ-related information in the data unit PPDU3 may be a subset of the HARQ-related information in the data unit PPDU2. For example, first N HARQ units (e.g., CWs or MPDUs) may be retransmitted with the HARQ-related information in the SIG field in the PHY preamble of the data unit PPDU3 in response to the data unit PPDU2. Or the HARQ-related information may indicate that all requested HARQ units are retransmitted. In this case, since this type of the SIG field includes both HARQ-related information and parameters to be used to decode the data field, the electronic device 400 may decode the data field of the data unit PPDU3 with parameters in the type of the SIG field of the data unit PPDU3. The control information may contain information as in common or user-specific usage.

In some embodiments, the data unit PPDU3 in HARQ procedure may contain, as the identification information, an identification information field to indicate whether the data unit PPDU3 contains retransmitted HARQ units for a first user. Since unsuccessfully decoded HARQ units may not be retransmitted immediately or information other than the unsuccessfully decoded HARQ units may be in urgent to transmitted initially to the first user, a next PPDU immediately following a previous PPDU addressed to the first user may not necessarily contain retransmitted HARQ units even if the electronic device 300 received the HARQ-related information as the HARQ feedback information from the electronic device 400.

In some embodiments, the HARQ-related information may indicate one codeword or two codewords where the number of HARQ units which can be indicated by the HARQ-related information is larger than the number of codewords $N_{CW}$. In some embodiments, a 4-bit bitmap or a field representing a state in a lookup table representing 16 states may be used as the HARQ-related information shown in Table 7 and Table 8 as below. For example, when the number of CW is not enough to use entire bitmap or entire states, 1 may mean the corresponding HARQ unit consisting of M codewords includes errors or the corresponding HARQ unit is retransmitted depending on whether it is included during the HARQ procedure.

TABLE 7

| Bitmap | Description |
| --- | --- |
| 0 | When New < number of HARQ units and Ncw = 1 |
| 1 | 0 indicates no error |
| | 1 indicates all codeword contains errors. (All the codeword should be retransmitted.) |
| | Note: The rest bits in Bitmap are reserved |
| 00 | When New < number of HARQ units and Now = 2 |
| 01 | 00 indicates no error |
| 10 | 01 indicates the second HARQ unit contains errors. The CW |
| 11 | associated the second HARQ should be retransmitted. |
| | 10 indicates the first codeword contains errors. The CW associated the first HARQ should be retransmitted. |
| | 11 indicates all codeword contains errors (All the codeword should be retransmitted.) |
| | Note The rest bits in Bitmap are reserved |
| 000 to 111 | . . . |
| 0000 to 1111 | . . . |

In Table 7, all ones in bitmap may indicate entire information should be retransmitted.

TABLE 8

| states | Description |
| --- | --- |
| 0 | No error included |
| 1 | The first HARQ units including errors. The CW associated the first HARQ units should be retransmitted. |
| . . . | |
| 15 | All the codeword retransmitted. |

In some embodiments, the HARQ-related information may contain the case where at least one HARQ unit includes errors such that corresponding indication (e.g. 0 in 4 bit lookup table format, the case when all information is correctly detected or decoded) should be reserved in bitmap format or lookup table format.

In some embodiments, any HARQ-related information as described above in the PHY preamble may be carried in one of the SIG fields where the HARQ-related information comes from the PPDU carrying HARQ feedback information. For example, as shown in FIG. 22, the HARQ-related information carried over in MAC portion of the data unit PPDU2 may be copied or recalculated (or mapped) to fit into the preamble portion of the data unit PPDU3. The HARQ-related information in the preamble may help the PHY entity itself to operate HARQ procedure when receiving the data unit PPDU3.

In some embodiment, assuming some fields in the SIG field are not updated during the retransmission, some fields in the SIG field may be reinterpreted.

In some embodiment, reserved information (such as Valid or disregard) in the SIG field may be used for HARQ purpose. For example, reserved bits of the SIG field may be used as the HARQ-related information.

In order to secure the space in the SIG field, WLAN system may support a PPDU type with no data field wherein HARQ-related information is carried in the SIG field instead of MAC frame. There is a control signal to indicate this type of PPDU. This type of PPDU may be used as in one of sequences, for example, shown in FIG. 22 and FIG. 28. When the SIG field is modulated with BPSK and with coding rate of 1/2, the SIG field can provide up to the number of bits which is 26×the number of SIG OFDM symbols. For example, when 32 SIG OFDM symbols are supported, then 104 bytes may be carried in the SIG field. When the SIG field modulated with QPSK and with coding rate of 1/2, the SIG field can provide up to the number of bits which is 52×the number of SIG OFDM symbols. For example, when 32 SIG OFDM symbols are supported, then 208 bytes may be carried in the SIG field. When the SIG field modulated with 16-QAM and with coding rate of 1/2, the SIG field can provide up to the number of bits which is 104×the number of SIG OFDM symbols. For example, when 32 SIG OFDM symbols are supported, then 416 bytes may be carried in the SIG field.

Assuming that the length of the SIG field may be long, a CRC field and a Tail field may be located regularly.

The PPDU may carry a first information to implicitly or explicitly indicate whether or not the PPDU contains at least one retransmitted HARQ unit. Since at least one initial HARQ unit and at least one retransmitted HARQ unit may be jointly transmitted in one PPDU assigned to multiple users, the first information may be user specific.

In some embodiments, the first information may be STA-ID. When the electronic device 400 requests the retransmission, the subsequent PPDU having the same STA-ID implicitly may mean the PPDU includes at least one retransmitted HARQ unit. However, this may result in the latency issues when the electronic device 300 has urgent new information to transmit.

In some embodiments, to allow to transmit the same STA with new information while an HARQ procedure is not finished, a first field may be used to indicate whether it is a retransmitted information. While the transmitted information is stored for a specific STA at the receiver side, when receiving the PPDU with the same STA-ID, the receiver needs to check the first field to see whether transmitted information should be combined into the stored information. If it indicates a new initial information to be transmitted, the electronic device 400 may separately process it from the stored information. For example, a Reserved subfield (e.g. B15) in a User field in the EHT-SIG field for a non-MU-MIMO allocation may be used as the first field.

In some embodiments, the first information may be MSI. When receiver gets PPDU with a first value of MSI for the first time, the electronic device 400 may consider it as the initial transmission for a specific STA-ID. Once the electronic device 400 gets the first value of MSI for the specific STA-ID, it may mean this PPDU includes the retransmitted HARQ unit for the specific STA-ID. Once receiver gets a second value of MSI for the specific STA-ID for the first time, regardless of whether the electronic device 400 stores the HARQ unit related to the first value of MSI, the STA needs to start a new HARQ procedure of the second MSI parallelly for the specific STA-ID.

Hereinafter, initial HARQ units and retransmitted HARQ units in HARQ procedures in accordance with various embodiments will be described with reference to FIG. 23 to FIG. 26.

Figures 23, 24:
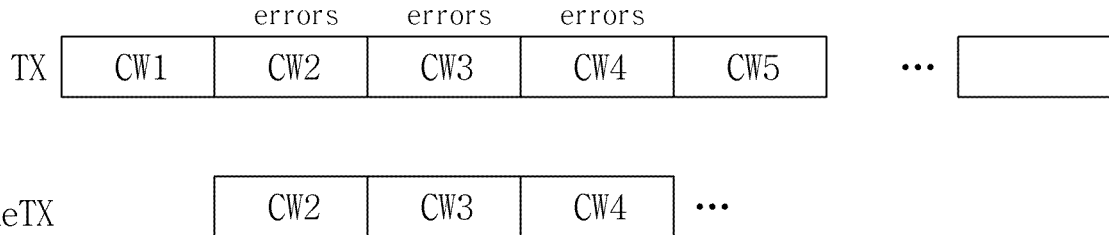
FIG. 23 shows initial HARQ units and retransmitted HARQ units in an HARQ procedure in accordance with an embodiment.
FIG. 24 shows initial HARQ units and retransmitted HARQ units in an HARQ procedure in accordance with another embodiment.

FIG. 23 shows initial HARQ units and retransmitted HARQ units in an HARQ procedure in accordance with an embodiment.

As described above, when a MPDU is used as the HARQ unit, the PHY entity responsible for the HARQ operation does not know about the MPDUs. The simplest solution is to transmit the entire packet, regardless of which MPDU(s) failed to be decoded.

Referring to FIG. 23, only the data unit MPDU2 failed to be decoded, but all MPDUs in the previous PPDU are retransmitted. However, this scheme may be inefficient in the presence of burst error where errors are occurred in narrow portion of the data information.

FIG. 24 shows initial HARQ units and retransmitted HARQ units in an HARQ procedure in accordance with another embodiment.

As described above, a codeword may be used as the HARQ unit. Since the codeword is a unit of processing in PHY layer, the electronic device 400 at the PHY needs to know whether erroneous codeword is transmitted or not, and which erroneous codeword is retransmitted. Based on that information, the electronic device 400 can combine the retransmitted CWs to stored CWs.

Referring to FIG. 24, the electronic device 400 may request the electronic device 300 to retransmit codewords CW2 to CW4 which failed to be decoded. After the electronic device 400 receives the retransmitted codewords CW2 to CW4, the electronic device 400 may combine retransmitted codewords CW2 to CW4 with the previous codewords CW2 to CW4 to forward the decoded bitstream to the MAC entity. If there is no error in the decoded bitstream, the MAC entity may terminate the HARQ procedure.

Figure 25:
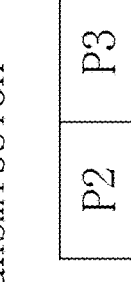
FIG. 25 shows initial HARQ units and retransmitted HARQ units in an HARQ procedure in accordance with another embodiment.

FIG. 25 shows initial HARQ units and retransmitted HARQ units in an HARQ procedure in accordance with another embodiment.

Referring to FIG. 25, LDPC codewords 1, 2, .... N as the HARQ units are transmitted, and each of the codewords includes information bits 1, 2, ..., and N and LDPC parity bits 1, 2, ..., and N. After the electronic device 400 fail to decode the codewords 2 and 3, the electronic device 400 may transmit the HARQ feedback information indicating that the codewords 2 and 3 have failed to be decoded. The electronic device 300 may retransmit parity bits 2 of the codeword 2 without information bits 2 of the codeword 2 and parity bits 3 of the codeword 3 without information bits 3 of the codeword 3, assuming that information bits used to generate parity bits to be retransmitted is the same as information bits used to generate parity bits of the initial transmission.

Figure 26:
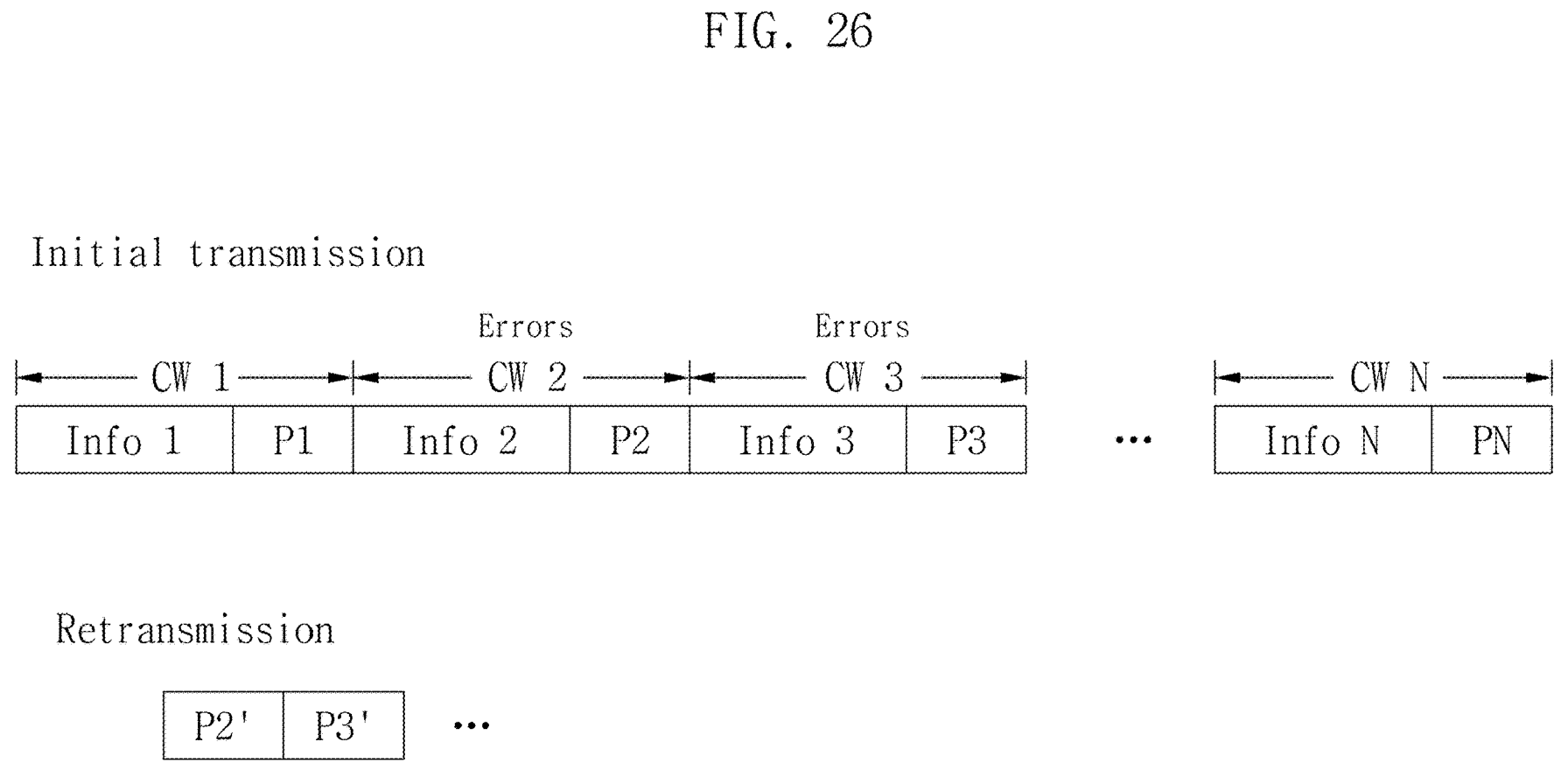

FIG. 26 shows initial HARQ units and retransmitted HARQ units in an HARQ procedure in accordance with another embodiment.

Referring to FIG. 25, LDPC codewords 1, 2, .... N as the HARQ units are transmitted, and each of the codewords includes information bits 1, 2, ..., and N and LDPC parity bits 1, 2, ..., and N. After the electronic device 400 fails to decode the codewords 2 and 3, the electronic device 400 may transmit the HARQ feedback information indicating that the codewords 2 and 3 have failed to be decoded. The electronic device 300 may retransmit parity bits 2' of the codeword 2 without information bits 2 of the codeword 2 and parity bits 3' of the codeword 3 without information bits 3 of the codeword 3, for example, when the electronic device 300 applies different puncturing patterns (e.g. different code rate) which contains bits that the initial transmitted codeword does not include.

In some embodiments, lengths of the HARQ units may be different between transmission and retransmission since keeping the same size of HARQ units may result in more padding during retransmissions. At receiver side, its corresponding information has been stored and used when combing with the retransmitted information.

In some embodiments, when the length of an HARQ unit is large enough comparing to the size of retransmitted information, padding may be appended to the retransmitted parity bits to fill the HARQ unit. For example, when the length of an HARQ unit is larger than the size of retransmitted information, the HARQ unit may include the retransmitted parity bits and padding bits.

Figure 27:
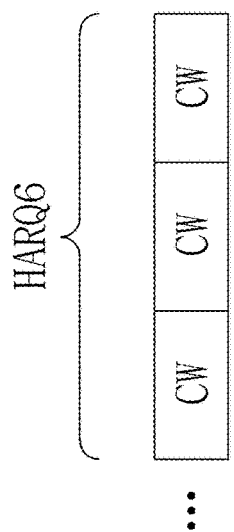
FIG. 27 shows HARQ units in an HARQ procedure in accordance with an embodiment.
Figure 27:
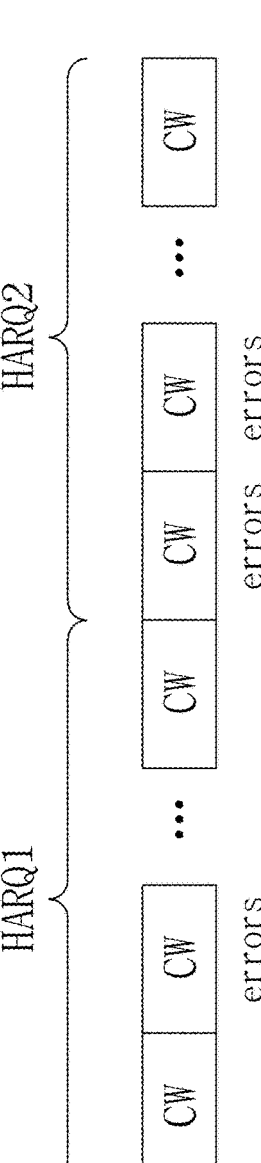

In some embodiments, when the length of an HARQ unit is large enough comparing to the size of retransmitted information, the retransmitted parity bits may be repeated in the HARQ unit, and then the padding may be appended to the retransmitted parity bits in the HARQ unit. For example, when the length of an HARQ unit is larger than the size of retransmitted information, the HARQ unit may include a plurality of repetitions of the retransmitted parity bits and padding bits. FIG. 27 shows HARQ units in an HARQ procedure in accordance with an embodiment.

As shown in FIG. 27, a set of codewords may be used as the HARQ unit. In some embodiments, the same number of codewords may be included in all sets of codewords. In some embodiments, the same number of codewords may be included in all sets of codewords except the last set of codewords, and the number of codewords in the last set is equal to or less than the number of codewords included in all sets except the last set.

In some embodiments, the preamble portion of the PPDUs in HARQ procedure may contain the HARQ-related information indicating which HARQ unit(s) contains errors. For example, there are $N_{CW}$ which is calculated in PHY layer. If the PHY layer recognizes the errors in codewords, the HARQ-related information may be transmitted to the MAC layer using one of RXVECTOR parameters when processing the received PPDU.

The HARQ-related information may be indicated with a bitmap including a plurality of bits. Each bit of the plurality of bits may be associated with a respective one of the plurality of HARQ units, and indicate whether associated HARQ unit is being retransmitted. If the HARQ-related information is indicated by a 6-bit bitmap and values of the 6-bit bitmap are 110000, it may mean that the first two HARQ units of six HARQ units contains errors. If a station receives the HARQ-related information indicated by the bitmap, the station may retransmit one or more of codewords respectively indicated by bits in the bitmap.

The HARQ-related information may be indicated with a field set equal to a state of a plurality of state in a lookup table. If the HARQ-related information is indicated by the lookup table, all potential error combination may be listed up. For example, if the value of the lookup table is 111111, it may mean that all HARQ units contains errors or all HARQ units should be retransmitted. If a station receives the HARQ-related information indicated by the lookup table, the station may retransmit one or more of codewords indicated by the value of the lookup table.

The HARQ-related information may be carried in MAC layer. Each status of CW (or each status of HARQ unit) may be transmitted over PPDU 2 in FIG. 22.

Compressed information or a part of the HARQ-related information may be retransmitted in the PHY preamble (e.g. PPDU3 shown in FIG. 22) in the following PPDUs.

In some embodiments, when the electronic device 400 receives the retransmitted HARQ unit(s), the electronic device 400 may probably check the HARQ-related information to know which HARQ units are retransmitted. In some embodiments, the electronic device 300 may not immediately retransmit the HARQ unit requested by the electronic device 400 depending on the transmitter's priority. For example, when the electronic device 400 transmits, to the electronic device 300, the HARQ feedback information to request the electronic device 300 to retransmit the first two HARQ units with the bitmap of 110000, the electronic device 300 may transmit a PPDU including only the first HARQ unit with the HARQ-related information indicated by the bitmap of 100000 and then may transmit a following PPDU including the second HARQ unit with the HARQ-related information indicated by the bitmap of 010000.

Figure 28:
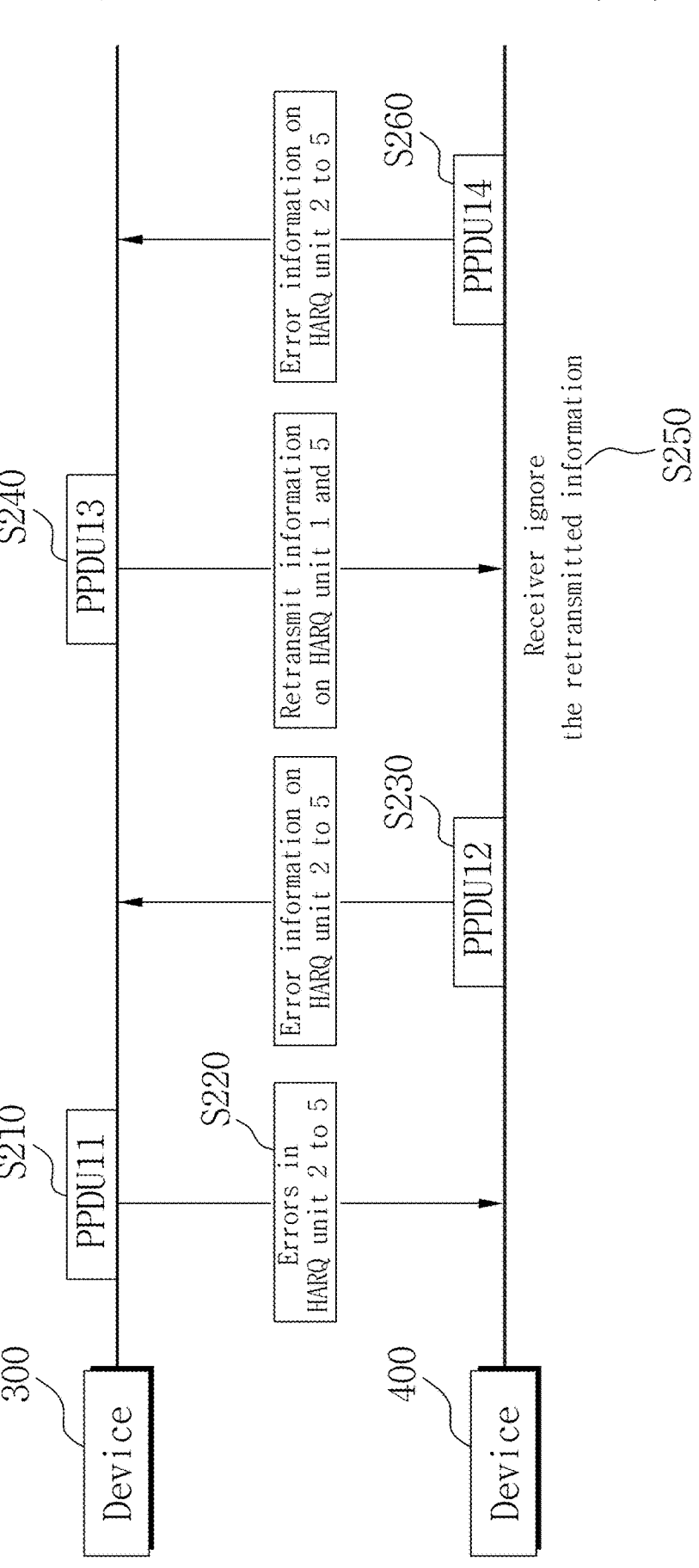
FIG. 28 shows an HARQ procedure in accordance with an embodiment.

FIG. 28 shows an HARQ procedure in accordance with an embodiment.

Referring to FIG. 28, at S210, the electronic device 300 may transmit a data unit PPDU11 including a plurality of HARQ units.

At S220, the electronic device 400 may fail to decode at least one HARQ unit among the plurality of HARQ units in the data unit PPDU11. For example, the electronic device 400 may fail to decode HARQ units 2 to 5.

At S230, the electronic device 400 may transmit a data unit PPDU12 including an HARQ feedback information to request the electronic device 300 to retransmit one or more HARQ units which fail to be decoded. For example, the HARQ feedback information may request the electronic device 300 to retransmit HARQ units 2 to 5.

At S240, the electronic device 300 may transmit a data unit PPDU13 including a plurality of HARQ units. In some cases, the electronic device 300 may not be allowed to retransmit HARQ unit(s) which the electronic device 400 did not request the electronic device 300 to retransmit. For example, the data unit PPDU13 may include the HARQ unit 1 which the electronic device 400 did not request the electronic device 300 to retransmit and the HARQ unit 5 which the electronic device 400 requested the electronic device 300 to retransmit, which is not allowed.

At S250, the electronic device 400 may determine whether the plurality of HARQ units in the data unit PPDU13 include an HARQ unit which the electronic device 400 did not request the electronic device 300 to retransmit and may ignore all HARQ units or all retransmitted HARQ units in the data unit PPDU13 when it is determined that the plurality of HARQ units in the data unit PPDU13 include the unrequested HARQ. For example, since the data unit PPDU13 includes the HARQ unit 1 which the electronic device 400 did not request the electronic device 300, the electronic device 400 may ignore all retransmitted HARQ units in the data unit PPDU13.

At 260, the electronic device 400 may transmit a data unit PPDU14 including an HARQ feedback information to request the electronic device 300 again to retransmit one or more HARQ units which the electronic device 400 ignored or did not receive. For example, since the receiver 200 ignored the retransmitted HARQ unit 5 and did not receive the HARQ units 2 to 4, the HARQ feedback information may request again the electronic device 300 to retransmit HARQ units 2 to 5.

Any embodiments above may be combined to support either HARQ procedure or LA procedure or both.

To illustrate the interchangeability of hardware and software, items such as the various illustrative blocks, modules, components, methods, operations, instructions, and algorithms have been described generally in terms of their functionality. Whether such functionality is implemented as hardware or software depends upon the particular application and design constraints imposed on the overall system. Skilled artisans may implement the described functionality in varying ways for each particular application.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the subject technology. The word exemplary is used to mean serving as an example or illustration. To the extent that the term "include," "have," or the like is used, such term is intended to be inclusive in a manner similar to the term "comprise" as "comprise" is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously or may be performed as a part of one or more other steps, operations, or processes. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using a phrase means for or, in the case of a method claim, the element is recited using the phrase step for.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. An electronic device for facilitating wireless communication, the device comprising:
   one or more memories; and
   one or more processors coupled to the one or more memories, the one or more processors configured to cause:
   receiving a first data unit including a first short training field (STF), a first long training field (LTF), a signal field, a second STF, a second LTF, and a data field including a first hybrid automatic repeat request (HARQ) unit;
   transmitting a second data unit including first HARQ-related information indicating that the first HARQ unit fails to be decoded;
   receiving a third data unit including a preamble, wherein the preamble includes a first STF, a first LTF, a signal field, a second STF, and a second LTF, and the third data unit includes second HARQ-related information indicating whether the third data unit includes retransmitted data, wherein the second HARQ-related information is included in the signal field of the preamble of the third data unit, and the signal field includes a user field including a first subfield indicating a station identifier and a second subfield indicating the third data unit includes retransmitted data;
   obtaining a second HARQ unit based on determination that the second HARQ-related information indicates that the third data unit includes retransmitted data; and
   decoding the second HARQ unit with the first HARQ unit.

2. The electronic device of claim 1, wherein:
   the first data unit includes a MAC header including a link adaptation control subfield including a first MCS (modulation and coding scheme) request (MRQ) subfield and a first MRQ sequence identifier (MSI) subfield,
   the third data unit includes a MAC header including a link adaptation control subfield including a second MRQ subfield and a second MSI subfield,
   the second MSI subfield set equal to a MSI value indicated by the first MSI subfield indicates that the third data unit includes retransmitted data, and
   the second MSI subfield set different from a MSI value indicated by the first MSI subfield indicates that the third data unit does not include retransmitted data.

3. The electronic device of claim 1, wherein the second HARQ-related information is indicated by a bitmap including a plurality of bits, each of the plurality associated with a respective one of HARQ units in the first data unit.

4. The electronic device of claim 1, wherein the second HARQ-related information is indicated by a field set equal to a state of a plurality of states in a lookup table, wherein the plurality of states in the lookup table represents a respective one of error combinations of HARQ units in the first data unit.

5. The electronic device of claim 1, wherein a scrambler seed used for the second HARQ unit is the same as a scrambler seed used for the first HARQ unit.

6. The electronic device of claim 1, wherein obtaining the second HARQ unit comprises:
receiving a fourth data unit following the third data unit, the fourth data unit including a first short training field (STF), a first long training field (LTF), a signal field, a second STF, and a second LTF, and a data field; and
obtaining the second HARQ unit from the data field of the fourth data unit according to parameters in the signal field in the fourth data unit.

7. The electronic device of claim 1, wherein the signal field of the third data unit includes no parameter used for obtaining the second HARQ unit and the second HARQ unit is obtained according to one or more parameters in the signal field in the first data unit.

8. The electronic device of claim 1, wherein the first HARQ unit is a low-density parity check (LDPC) codeword including information bits and parity bits.

9. The electronic device of claim 8, wherein the second HARQ unit is a low-density parity check (LDPC) codeword including information bits and parity bits.

10. The electronic device of claim 8, wherein the second HARQ unit is a low-density parity check (LDPC) codeword including parity bits and excluding information bits.

11. The electronic device of claim 1, wherein the first HARQ unit is a group of low-density parity check (LDPC) codewords.

12. The electronic device of claim 1, wherein the first HARQ unit is a MPDU.

13. The electronic device of claim 1, wherein the one or more processors configured to further cause:
discarding the first HARQ unit if the third data unit include a HARQ unit that is not indicated by the first HARQ-related information.

14. An electronic device for facilitating wireless communication, the device comprising:
one or more memories; and
one or more processors coupled to the one or more memories, the one or more processors configured to cause:
transmitting a first data unit including a first short training field (STF), a first long training field (LTF), a signal field, a second STF, a second LTF, and a data field including a first hybrid automatic repeat request (HARQ) unit;

receiving a second data unit including first HARQ-related information indicating that the first HARQ unit fails to be decoded; and
transmitting a third data unit including a preamble, wherein the preamble includes a first STF, a first LTF, a signal field, a second STF, and a second LTF, and the third data unit includes second HARQ-related information indicating whether the third data unit includes retransmitted data, wherein the second HARQ-related information is included in the signal field of the preamble of the third data unit and the signal field includes a user field including a first subfield indicating a station identifier and a second subfield indicating the third data unit includes retransmitted data.

15. The electronic device of claim 14, wherein:
the first data unit includes a MAC header including a link adaptation control subfield including a first MCS (modulation and coding scheme) request (MRQ) subfield and a first MRQ sequence identifier (MSI) subfield,
the third data unit includes a MAC header including a link adaptation control subfield including a second MRQ subfield and a second MSI subfield,
the second MSI subfield set equal to a MSI value indicated by the first MSI subfield indicates that the third data unit includes retransmitted data, and
the second MSI subfield set different from a MSI value indicated by the first MSI subfield indicates that the third data unit does not include retransmitted data.

16. A method performed by an electronic device, comprising:
receiving a first data unit including a first short training field (STF), a first long training field (LTF), a signal field, a second STF, a second LTF, and a data field including a first hybrid automatic repeat request (HARQ) unit;
transmitting a second data unit including first HARQ-related information indicating that the first HARQ unit fails to be decoded;
receiving a third data unit including a preamble, wherein the preamble includes a first STF, a first LTF, a signal field, a second STF, and a second LTF, and the third data unit includes second HARQ-related information indicating whether the third data unit includes retransmitted data, wherein the second HARQ-related information is included in the signal field of the preamble of the third data unit and the signal field includes a user field including a first subfield indicating a station identifier and a second subfield indicating the third data unit includes retransmitted data;
obtaining a second HARQ unit based on determination that the second HARQ-related information indicates that the third data unit includes retransmitted data; and
decoding the second HARQ unit with the first HARQ unit.

* * * * *